United States Patent
Taylor, Sr.

(10) Patent No.: US 7,328,556 B2
(45) Date of Patent: *Feb. 12, 2008

(54) BAG SEALING SYSTEM AND METHOD

(76) Inventor: Mark W. Taylor, Sr., 507 Valann Dr., Lathrop, MO (US) 64465

( * ) Notice: Subject to any disclaimer, the term of this patent is extended or adjusted under 35 U.S.C. 154(b) by 34 days.

This patent is subject to a terminal disclaimer.

(21) Appl. No.: 11/073,559

(22) Filed: Mar. 7, 2005

(65) Prior Publication Data
US 2005/0150195 A1    Jul. 14, 2005

Related U.S. Application Data

(63) Continuation-in-part of application No. 10/345,763, filed on Jan. 16, 2003, now Pat. No. 6,862,867.

(51) Int. Cl.
B65B 31/02    (2006.01)
(52) U.S. Cl. .................... 53/512; 53/86; 53/375.3; 53/434; 53/477
(58) Field of Classification Search ................ 53/512, 53/374.8, 375.3, 432, 434, 477, 509, 510, 53/513
See application file for complete search history.

(56) References Cited

U.S. PATENT DOCUMENTS

| | | | |
|---|---|---|---|
| 2,913,863 A | 11/1959 | Sylvester et al. |
| 3,597,897 A | 8/1971 | Gerard |
| 3,699,742 A | 10/1972 | Giraudi |
| 3,775,225 A | 11/1973 | Schott |
| 3,779,838 A | 12/1973 | Wech |
| 3,832,824 A | 9/1974 | Burrell |
| 3,958,391 A | 5/1976 | Kujubu |
| 4,164,111 A | 8/1979 | Di Bernardo |
| 4,221,101 A | 9/1980 | Woods |
| 4,550,548 A | 11/1985 | Owensby et al. |
| 4,578,928 A | 4/1986 | Andre et al. |
| 4,583,347 A | 4/1986 | Nielsen |

(Continued)

OTHER PUBLICATIONS

PCT International Search Report, PCT/US04/00716, International Filing Date Jan. 13, 2004, Pack-Tech, LLC, Applicant.

*Primary Examiner*—Thanh K. Truong
(74) *Attorney, Agent, or Firm*—Mark Brown

(57) ABSTRACT

A system for sealing thermoplastic film includes one or more bag sealing units, each comprising a lower vacuum platen and a vacuum chamber cover adapted for sealing engagement on the platen to form a vacuum chamber. A sealing bar assembly includes a sealing bar designed for constant heated operation and a pair of cooling plates which function as heat sinks. The sealing bar assembly is pneumatically reciprocated between a raised, disengaged position and a lowered position with the sealing bar engaging the neck of a bag for hermetically sealing same. The cooling plates clamp the bag neck against a sealing support assembly. A method of sealing a thermoplastic film bag includes the steps of placing a packaging object in a thermoplastic bag and placing the bag on a cradle with the bag neck extending over a bag support assembly. A vacuum chamber cover is placed on the platen and evacuated to form a vacuum chamber. A sealing bar assembly melds the thermoplastic to form a sealed area across the bag neck. A cutoff knife blade severs the end of the bag beyond a sealed area, which extends across its neck.

9 Claims, 30 Drawing Sheets

U.S. PATENT DOCUMENTS

| | | |
|---|---|---|
| 4,601,159 A | 7/1986 | Mugnai |
| 4,640,081 A | 2/1987 | Kawaguchi et al. |
| 4,754,596 A * | 7/1988 | Yasumune et al. ............ 53/434 |
| 4,798,039 A | 1/1989 | Deglise |
| 4,843,796 A | 7/1989 | Furukawa |
| 4,845,927 A | 7/1989 | Rapparini |
| 4,860,523 A | 8/1989 | Teteishi |
| 4,903,459 A * | 2/1990 | Okinaka ...................... 53/434 |
| 4,926,614 A | 5/1990 | Costello et al. |
| 5,056,292 A | 10/1991 | Natterer |
| 5,062,252 A | 11/1991 | Kupcikevicius |
| 5,097,648 A | 3/1992 | Berner et al. |
| 5,131,213 A | 7/1992 | Shanklin et al. |
| 5,282,349 A * | 2/1994 | Siegel ......................... 53/433 |
| 5,351,463 A | 10/1994 | Aarts |
| 5,371,998 A | 12/1994 | Johnson et al. |
| 5,386,678 A | 2/1995 | Kujubu |
| 5,435,114 A | 7/1995 | Moehlenbrock et al. |
| 5,438,883 A | 8/1995 | McLean |
| 5,528,880 A | 6/1996 | Landolt |
| 5,638,664 A | 6/1997 | Levsen et al. |
| 5,640,081 A | 6/1997 | Austin et al. |
| 5,682,727 A | 11/1997 | Harte et al. |
| 5,692,360 A | 12/1997 | McDonald et al. |
| 5,784,862 A | 7/1998 | Germano |
| 5,822,956 A | 10/1998 | Liechi et al. |
| 5,893,822 A | 4/1999 | Deni et al. |
| 6,324,818 B1 | 12/2001 | Morness et al. |
| 6,539,689 B1 * | 4/2003 | Yoshimoto ................... 53/434 |
| 6,862,867 B2 * | 3/2005 | Cady et al. .................. 53/434 |
| 2004/0060262 A1 | 4/2004 | Harges et al. |

* cited by examiner

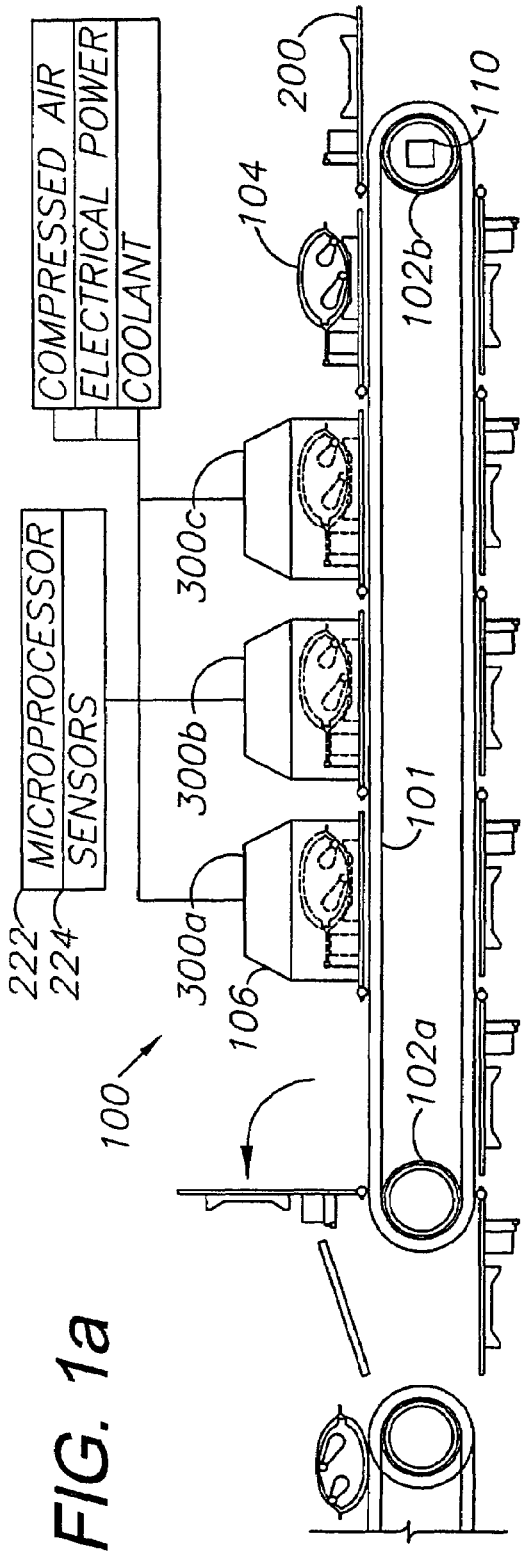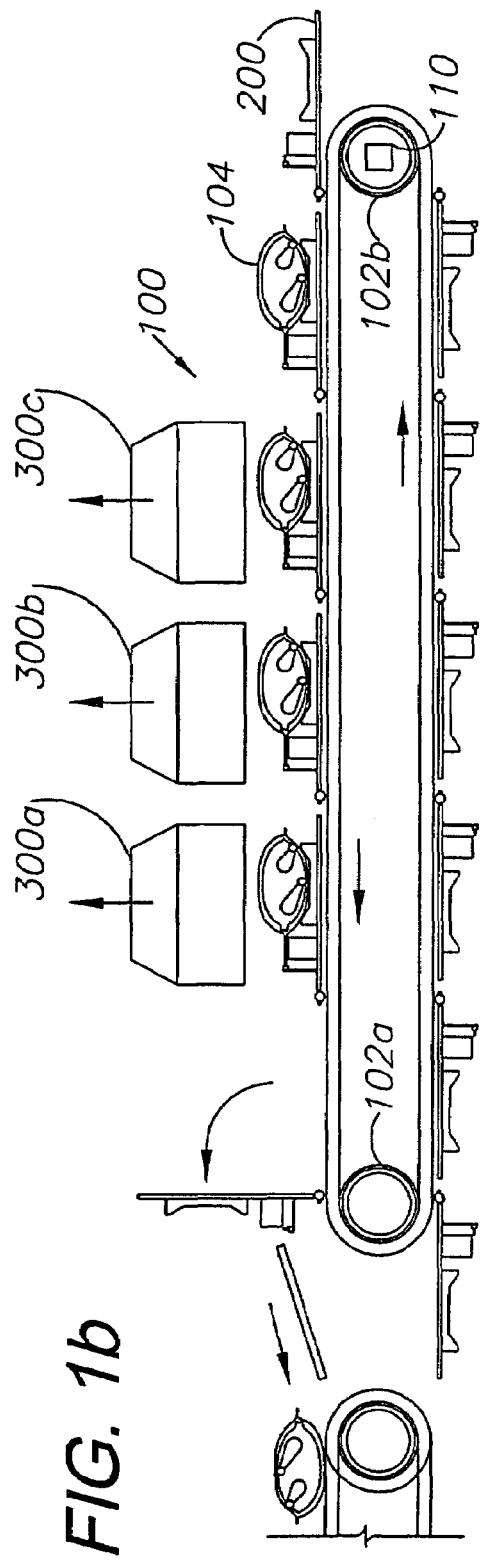

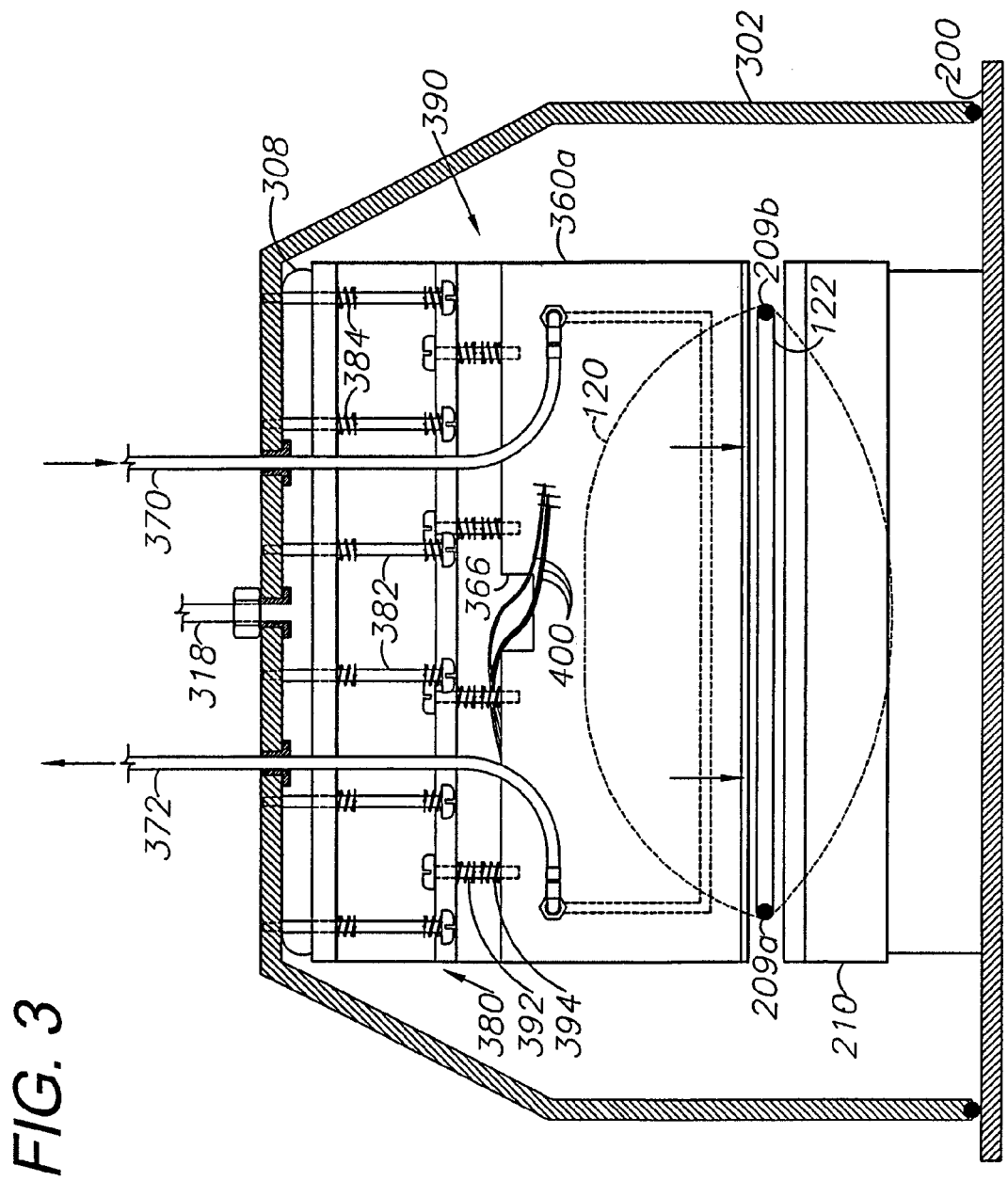

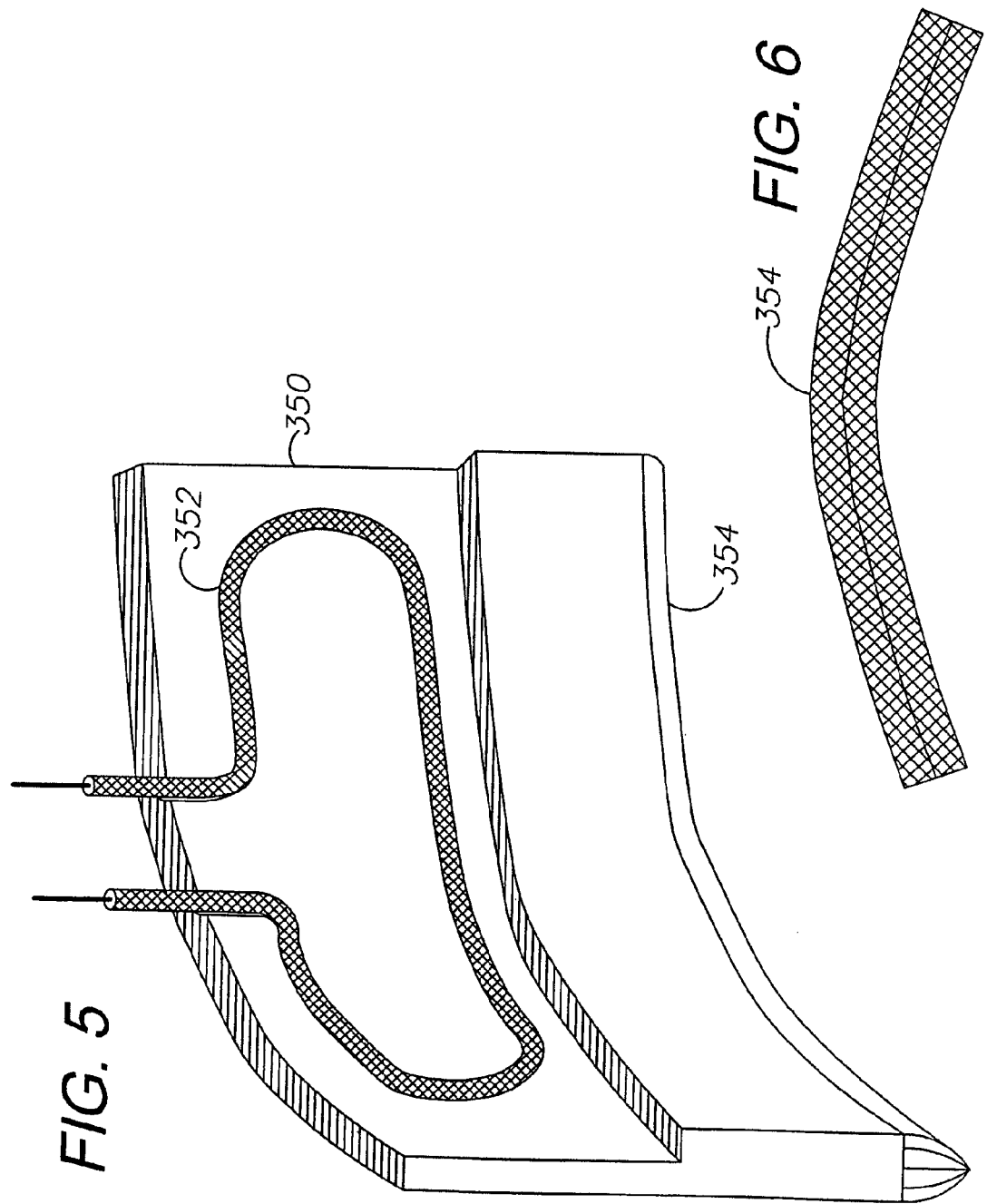

BAG SEALING SYSTEM AND METHOD

CROSS-REFERENCE TO RELATED APPLICATION

Continuation-in-part of U.S. patent application Ser. No. 10/345,763, filed Jan. 16, 2003; U.S. Pat. No. 6,862,867, issue date Mar. 8, 2005, which is incorporated herein by reference.

BACKGROUND OF THE INVENTION

The present invention relates generally to vacuum packaging, and more particularly to an apparatus and system for thermally sealing bags using a constant temperature heat source located adjacent to one or more heat sinks.

It is known in the prior art to seal perishable items, such as food products, by placing the item in a plastic bag, evacuating a substantial portion of the air within the bag to form a partial vacuum, and heat-sealing the bag opening to hermetically seal the bag and preserve the vacuum. Typically, this process is performed within a vacuum chamber. The bag containing the item or items to be packaged is placed into the chamber, and the chamber is closed. Air is evacuated from the chamber and the open end of the bag is sealed using a heat-sealing bar. As the bar comes into contact with the plastic, the plastic of both walls of the bag is melted, thereby causing the walls to meld or adhere to one another.

Ordinarily, the vacuum chamber comprises two major elements or assemblies, an upper lid or cover assembly that houses the heat sealing mechanism and a blade for trimming excess bag material, and a lower base or platen assembly that holds the bag and product to be packaged, valves, sealing support device, cutting support device, and vacuum pump.

A significant problem in food packaging applications relates to "leakers", which result from defective seals. For example, meats and other packaged foods commonly have natural juices, fat particles, preservatives and other substances trapped in their bags. These substances are sometimes trapped in the bag openings as they are sealing, and prevent the thermoplastic film from closing air-tight across the mouths of the bags. Bag closures can thus be compromised with leak channels that form where the bag portions do not completely seal, which create leakers allowing fluid to leak out and other substances to leak in and potentially contaminate the packaged food products. Leakers tend to be aesthetically unacceptable for retail merchandising because they create unattractive packages, which customers tend to avoid. They can also discharge substances onto surrounding packages, store displays, shipping containers, etc. Leakers can occur in approximately 7%-20% of the thermoplastic bags sealed with current technology. Therefore, achieving complete, fluid-tight seals with minimal "leakers" is an important criterion in the design and operation of bag sealing equipment. A design strategy for eliminating leak passages involves providing a relatively wide area of engagement with crisscrossing sealing lines whereby a leak passage would have to cross multiple sealing lines in order to compromise the bag. On the other hand, equipment designs which place total reliance on single seal lines for bag closures tend to be more susceptible to being compromised by leak passages. For example, much of the current bag sealing equipment provides sealed areas that are only about 3 mm wide, and are thus susceptible to leak channels.

A heat sealing method commonly used in the prior art is known as impulse sealing. Impulse sealing includes the intermittent application of electric current "impulses" to a heating element in a sealing bar. The sealing bar was formed of metal or other materials that transmit heat to the plastic bag. As the sealing bar was brought into contact with the plastic to be melted, an impulse of electrical current was applied to the heating element, which heated the sealing bar long enough to fuse or melt-weld ("meld") the plastic bag. The heating element was then deenergized, thus allowing the sealing bar to cool until the next heating/cooling cycle began.

Such heating/cooling cycles tended to cause operating problems with prior art equipment. For example, delays occurred and energy was wasted as components, such as heating bars, were brought up to operating temperatures and then allowed to cool. Therefore, prior art components with substantial thermal mass tended to incur substantial operating delays and consumed considerable amounts of energy due to their cyclic operations. Moreover, heating/cooling cycles tended to expand and contract thermally conductive components, such as metals and ceramic-core heating elements. The resulting expansion/contraction cycles subjected the equipment to wear. Operators of prior art impulse-type bag sealing equipment thus incurred operating expenses for replacement parts, repairs and downtime.

On the other hand, constant-temperature sealing bars can benefit from greater thermal mass because they tend to be less affected by heat loss to the workpieces. For example, equipment for sealing thermoset plastic bags tends to operate more efficiently and with less wear if operating temperatures are maintained relatively constant. However, thermal energy from constant-heat sealing bars can dissipate throughout the equipment and cause other problems. The present invention addresses these and other problems with the prior art by providing heat sinks on both sides of a heating bar, thus focusing and directing the radiant heat output along a relatively narrow strip or "heat zone".

Heretofore there has not been available a bag sealing system and method with the advantages and features of the present invention.

SUMMARY OF THE INVENTION

In the practice of the present invention, a bag sealing system includes one or more bag sealing units, each comprising a lower vacuum platen and a vacuum chamber adapted for sealing engagement on the platen. A sealing bar assembly includes a sealing bar designed for constant heated operation and located between a pair of heat sink/cooling plates which function as heat sinks. The sealing bar assembly is pneumatically reciprocated between a raised, disengaged position and a lowered position with the sealing bar engaging the neck of a bag for hermetically sealing same. The cooling plates clamp the bag neck against a sealing support assembly. A cutoff knife blade severs the end of the bag beyond a sealed area, which extends across its neck. In the practice of the method of the present invention, a packaging object is placed in a thermoplastic bag, which is then placed on a cradle mounted on the platen with the bag neck extending over a sealing support assembly. A vacuum chamber is placed on the platen and a partial vacuum is drawn in the vacuum chamber, thus evacuating the bag. A sealing bar assembly melds the thermoplastic to form a sealed area across the bag neck. After the vacuum chamber is open, the closed bag is heat-shrunk to a final, reduced-volume configuration.

OBJECTS OF THE INVENTION

It is, therefore, an object of the present invention to provide a constant temperature heat sealing device for vacuum packaging machines that avoids the problems of prior art impulse sealing devices such as oxidation of the element and mechanical stress due to rapid and frequent temperature fluctuations.

It is a further object to provide a constant temperature heat-sealing device that hermetically closes a plastic bag after evacuation of the air inside the bag.

Another object is to provide a constant temperature heat-sealing device wherein the sealing bar may be linear or curved, flat or crowned, as required by the material to be sealed.

Another object of the present invention is to provide a continuous temperature heat-sealing device that works well using relatively large heating elements having an increased thermal mass.

It is a further object of the invention to provide a continuous temperature heat-sealing device that yields a relatively low failure ("leaker") rate in sealed bags.

Another object is to provide a heat-sealing device that can withstand high pressure water wash-down.

A further object of the invention is to accommodate thermoplastics of various thickness, including relatively thick bags.

Yet another object of the invention is to provide bag sealing units adapted for stand-alone, endless-belt and circular conveyor types of operations.

It is a further object to provide a heat-sealing device that is capable of creating a seal width in the range of about 2 mm to 10 mm.

BRIEF DESCRIPTION OF THE DRAWINGS

FIG. 1a is a side elevational view of a bag sealing system embodying the present invention.

FIG. 1b is another side elevational view thereof, shown with the vacuum sealing units raised.

FIG. 3 is a transverse cross-section thereof taken generally along line 3-3 in FIG. 2a.

FIG. 4b is a fragmentary, side elevational view thereof, taken generally along line 4b-4b in FIG. 4a.

FIG. 5 is an orthographic view of a sealing bar thereof, shown with a cover plate removed.

FIG. 6 is a top plan view of the sealing bar, taken generally along line 6-6 in FIG. 8.

DETAILED DESCRIPTION

Figure 2A:
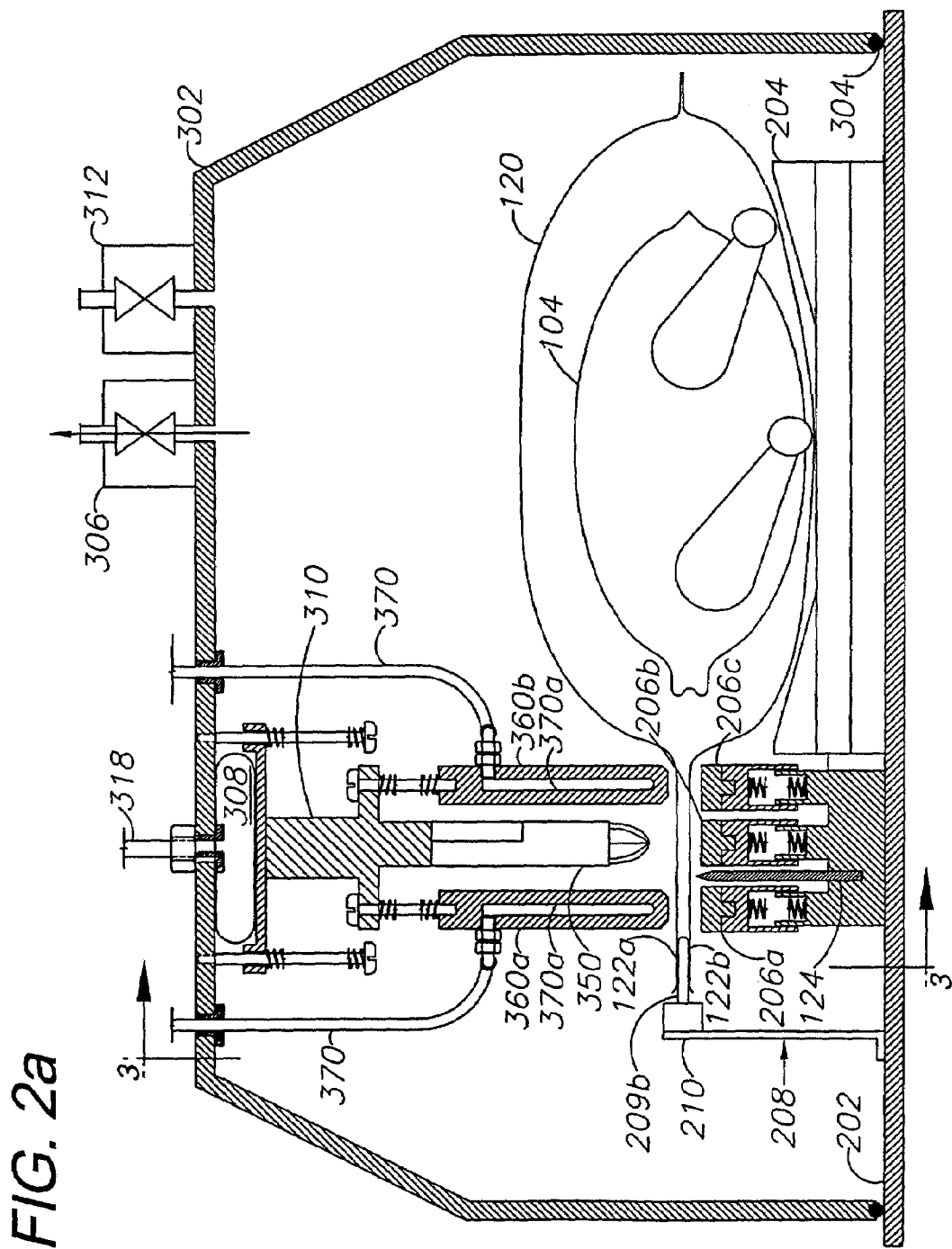
FIG. 2a is a longitudinal cross-section of a bag sealing unit in a closed-cover position.

Turning to the figures, FIGS. 1a and 1b illustrate an automated multiple-chamber vacuum packaging machine 100. The machine includes a continuous, driven chain or belt 101 supported on and driven by an idler roller 102a and a drive roller 102b. As illustrated, a circuitous train of lower vacuum platens 200 are fastened at their leading edges to the belt 101. Preferably, the platens 200 are made of stainless steel. As illustrated in FIG. 1b, the platens are moving counterclockwise in a direction from right to left across the top. The belt 101 is driven by sprocket and bearing assemblies that are fixed to a drive shaft and a free wheeling shaft (not shown). The drive shaft is driven by a servo drive gear reduction motor 110. Three vacuum chambers 300 (individually denoted by numbers 300a, 300b and 300c) are mounted above the belt 101. The platens 200 and respective vacuum chambers 300 collectively form respective bag sealing units 106, which are capable of automated or semi-automated operation (FIGS. 1a, b), or stand-alone operation as individual bag sealing units 106.

The vacuum packaging machine 100 operates as follows. The belt 101 moves counterclockwise (i.e., from right-to-left across the top). Movements can be continuous or intermittent, the latter being adapted for "batch"-type operations, thereby moving the lower vacuum platens 200 underneath the vacuum chambers 300. The packaging machine 100 rate of output is generally governed by the number of vacuum chambers 300 usable simultaneously in operation, together with the duration of the process steps in each unit. Preferably, each vacuum chamber 300 operates independently and simultaneously. The packaging machine 100 uses all available empty vacuum chambers 300 by means of sensors 224 that monitor various operating parameters, such as timing, temperature and pressure with respect to the vacuum chambers 300 and the bag sealing units 106, the rate of chain 101 movement and availability of vacuum chambers 300. A programmable microprocessor controller 222 can be connected to the sensors 224 and other components of the system 100 for controlling its operation, particularly in automated and semi-automated operating modes.

In operation, each independent vacuum chamber 300 performs the following functions. The vacuum chamber cover 302 descends upon a vacuum platen 200 positioned directly below (see 300a, FIG. 1). The vacuum chamber cover 302 forms a seal with the upper surface 202 of the vacuum platen by means of a seal gasket 304 (see FIGS. 2a and 2b). Air within the sealed chamber 300 is then evacuated by means of an exhaust valve 306 located in the top surface of the cover 302 and connected to a suitable vacuum source, such as a compressor. A vacuum sensor (not shown) monitors the air pressure in the chamber 300 and reports the pressure value to the microprocessor controller 222. An air pressure set point has been previously programmed into the microprocessor controller 222. When the set point is reached, the microprocessor controller 222 triggers an air compressor (not shown) to inflate a bladder 308 located on the inner, upper surface of the cover 302. The bladder 308 fills with compressed air, provided through bladder air supply line 318, and expands downward, forcing the sealing bar assembly 310 downward (FIG. 2b) and overcoming the return springs 384. The sealing bar 350 is mounted on the lower extremity of the sealing bar assembly 310.

As illustrated in FIG. 2a, prior to closure of the cover 302, an item 104 to be vacuum sealed, in this case a poultry carcass, has been placed inside a plastic vacuum seal bag 120 upon a cradle 204 located on the upper surface 202 of the vacuum platen 200. The bag 120 is made of a thermoplastic film known in the industry for heat sealing and heat shrinking applications. The bag 120 is oriented so that the open neck 122 lies on top of a sealing support assembly 205 with spring-loaded engagement gaskets 206a, 206b and 206c. In addition to lying over the tops of the gaskets 206a,b,c, the neck 122 is fitted over a set of neck retention pins 209 that hold the neck 122 of the bag open so that air may be drawn out of the bag 120 by the vacuum created in the chamber 300.

After closing the cover 302 against the platen 200 and evacuating the air inside the chamber 300 to the pre-programmed set point, the sealing bar 350 is forced downward by the expanding inflatable bladder 308, thereby coming into contact with the plastic of the neck 122. The sealing bar 350 continues to move downward, overcoming the upward spring 216 bias of the engagement gaskets 206a,b,c. As the sealing bar 350 moves downward the neck 122 is pushed against a fixed cutoff blade 124. The neck 122 of the bag 120 is thereby sheared or cutoff by the cutoff blade 124, which separates a neck cutoff portion 122c. The device is calibrated so that downward motion of the sealing bar 350 ceases shortly after the neck 122 of the bag is driven against the cutoff blade 124 and severed.

The sealing bar 350 includes a contact surface 354, which contacts the plastic of the neck 122, thus transferring thermal energy to the plastic film, melting the plastic and causing the upper wall 122a and the lower wall 122b to meld or fuse together, creating a thermocompressive bond at 122d. Shortly before the sealing bar 350 comes into contact with the neck 122, two heat sink/cooling plates 360a,b also come into contact with the surface of the neck 122, one on either side of the sealing bar 350, along their respective cooling plate lower edges 362a,b. The cooling plates 360a,b are attached to the seal bar assembly 310, and are driven downward along with the sealing bar 350 by the force of the inflated bladder 308. The heat sink/cooling plates 360 provide means for cooling the portion of the neck 122 proximate the area of contact between the sealing bar 350 and plastic film, thereby minimizing shrinkage of the neck 122 during heat sealing. The cooling plates 360 also serve to hold the neck 122 in position by clamping same against the engagement gaskets 206a,c during the sealing operation.

The three engagement or support gaskets 206a,b,c are spring biased, so that they maintain upward pressure against the neck 122 while yielding to the downward force of the sealing bar 350 and the cooling plates 360a,b. In addition, the cooling plates 360a,b are also spring biased so that towards the end of the downward stroke of the sealing bar assembly 310 the sealing bar 350 may move past the cooling plates 360a,b, driving further downward and causing the neck 122 to be cut against the bag cutoff blade 124.

After the sealing bar 350 has achieved its full downward stroke (FIG. 2b), compressing engagement gasket 206b, an inlet valve 312 is activated and the chamber 300 returns to atmospheric pressure. The cover 302 is then raised and the chain 101 advances the platen 200 with the sealed bag 120 further down the line.

As referenced above, the neck 122 of the bag 120 is held open during the sealing process by a pair of neck retention pins 209a and 209b. A side view of pin 209b may be seen in FIGS. 2a through 2c.

Figure 2B:
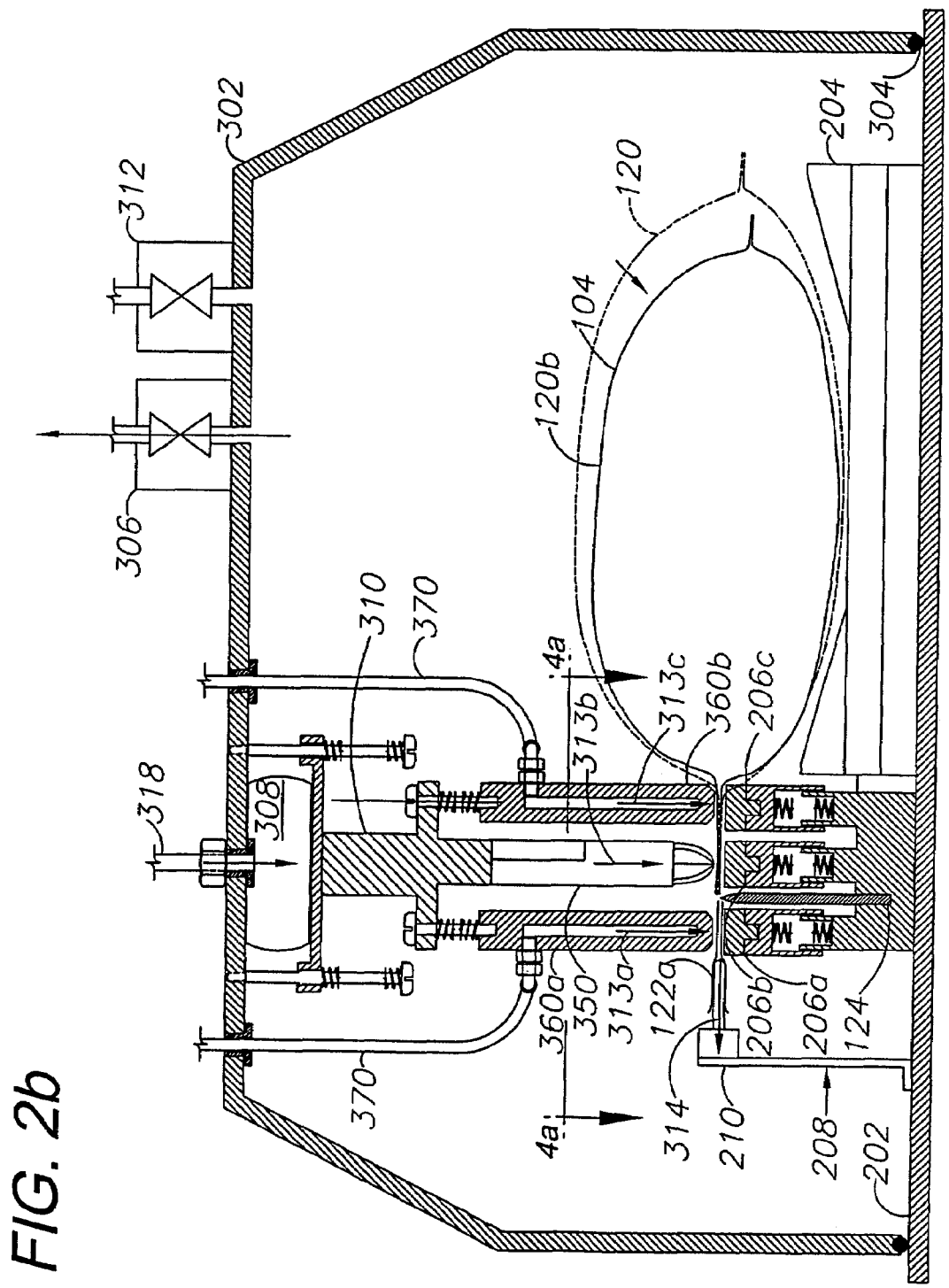
FIG. 2b is a longitudinal cross-section section thereof with a sealing bar assembly engaged.

FIG. 2b illustrates the downward travel of the sealing bar assembly 310 with arrows 313a, 313b and 313c indicating the downward direction of travel. Arrow 314 indicates the direction of the final evacuation of air from the bag 120, which is achieved just prior to incision of the neck 122 by the cutting blade 124. Dashed line 120a indicates the relative size of the bag 120 prior to the final expulsion of air which reduces it to the size indicated by the solid line 120b. FIG. 2b also illustrates the bladder 308 in its inflated state.

Figure 2C:
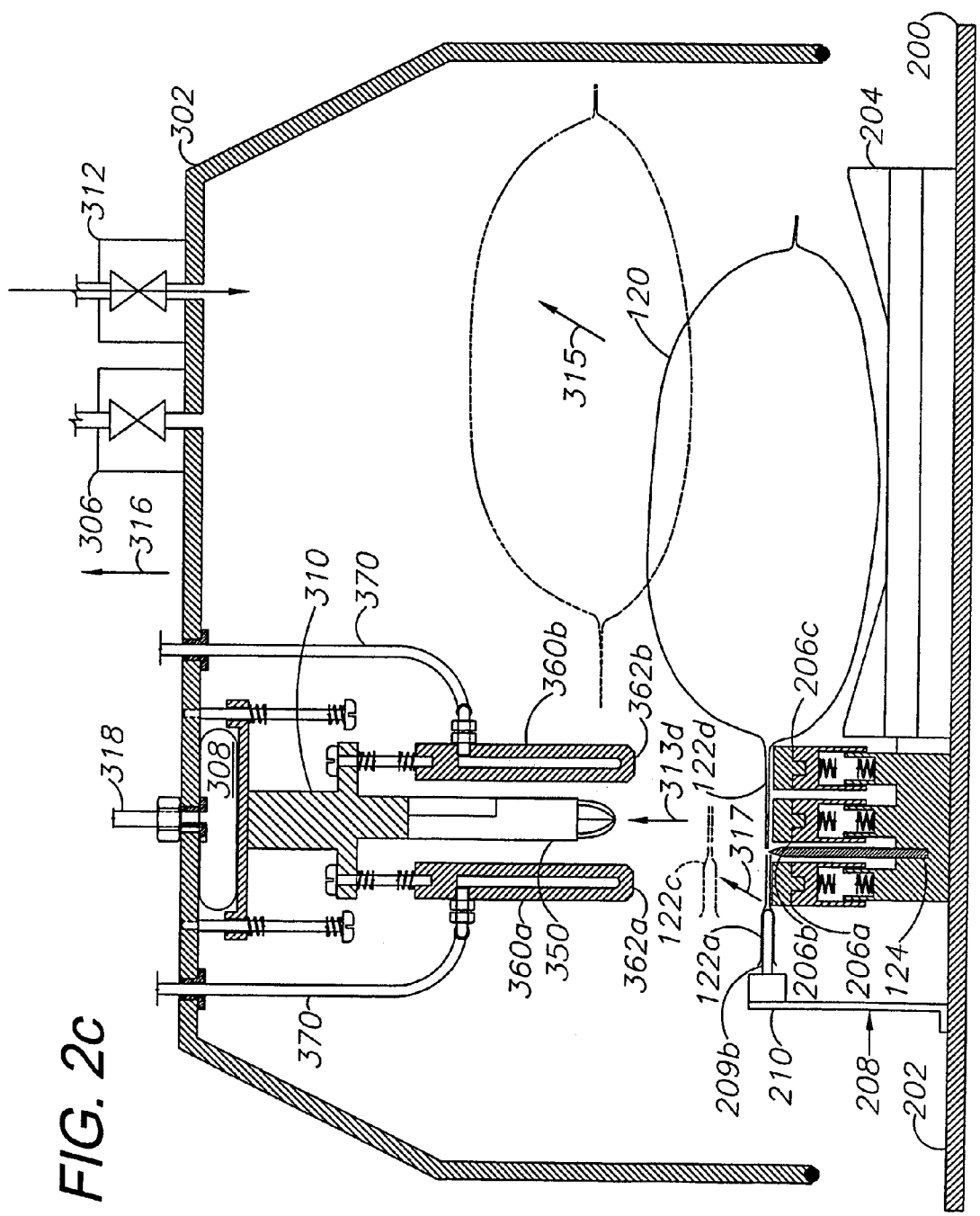
FIG. 2c is a longitudinal cross-section section thereof with the vacuum chamber raised.

As shown in FIGS. 2a-c, the cradle 204 may be formed with a concave upper surface to receive an item 104 having a curved or rounded shape.

FIG. 2c illustrates the apparatus at the conclusion of a cycle, in which the cover 302 has been lifted off of the platen 200. The sealed bag 120 is shown being removed from the cradle 204. Arrow 315 indicates the upward direction of travel of the bag 120 as it is being removed. It should be appreciated that removal of the sealed bag 120 typically occurs after full retraction (lifting) of the cover 302. Arrow 313d indicates the upward direction of travel of the seal bar assembly 310 as it is retracted upwards by expulsion of air from the bladder 308. Arrow 316 indicates the upward direction of travel of the cover 302 as it is raised above the platen 200.

In FIG. 2c the neck 122 is shown after being separated by the cutting blade 124. The portion of the neck 122 remaining attached to the body of the bag 120 contains the sealed portion of the neck 122d (see FIG. 14 for a top view of the sealed portion 122d of the neck 122). The cut-off remnant 122c of the neck 122 is ejected from the neck retention pins 209, as shown by arrow 317 indicating the upward direction of travel, and phantom lines indicating the ejected neck remnant 122c.

FIG. 3 is a partial cross-sectional view along line 3-3 in FIG. 2a. The cover 302 and the platen 200 are shown in cross section and the plastic bag 120, the neck and in the in a and to the 122 and the pins 209a,b are shown in phantom lines. As illustrated, the bladder 308 is located on the upper inside surface of the cover 302 and is in communication with an air supply hose 318 which is in further communication with an air pump or compressor (not shown). A seal bar assembly suspension 380 comprises spring biased bolts 382 that support the seal bar assembly 310 by attachment to the upper inside surface of the cover 302. The springs 384 force the assembly 310 upward, squeezing against the bladder 308 when the assembly 310 is in the retracted position. When air pressure to the bladder 308 is increased through the air supply hose 318, the force exerted by the expanding bladder walls overcomes the tension of the springs 384, causing the assembly 310 to slide downward along the shafts of the bolts 382.

A cooling plate suspension system 390 is also illustrated in FIG. 3. The cooling plates 360a,b are attached to the sealing bar assembly 310 via bolts 392 mounting return springs 394. When the cooling plates 360a,b contact respective engagement gaskets 206a,c, the tension in the springs 394 may be overcome by a greater force associated with the downward travel of the cooling plates 360a,b.

The elongated, convex side of the cooling plate 360a is illustrated in FIG. 3, including a notch 366 in the upper surface of the cooling plate 360a which provides egress for electrical supply wiring 400. The wiring 400 conducts a controlled current to the heating element 352 (FIG. 5). The heating element 352 supplies thermal energy to the sealing bar 350, which is thus maintained at a selected, relatively constant temperature. Typically, the thermal energy supplied to the sealing bar 350 is regulated by controlling the current applied to the heating element 352 through setting a desired temperature value in a microprocessor-controlled thermostat (not shown).

Water inlet and outlet lines 370, 372 lead to and from the cooling plates 360a,b. During operation of the vacuum packaging machine 100, cool water (or other suitable coolant) is provided to the interior of the cooling plates 360a,b for circulation through internal coolant passages 370a,b. The temperatures of the surfaces of the cooling plates 360a,b are thereby reduced, concurrently lowering the temperature of the portion of the plastic bag 120 contacted by the cooling plates 360a,b during sealing.

Figure 4A:
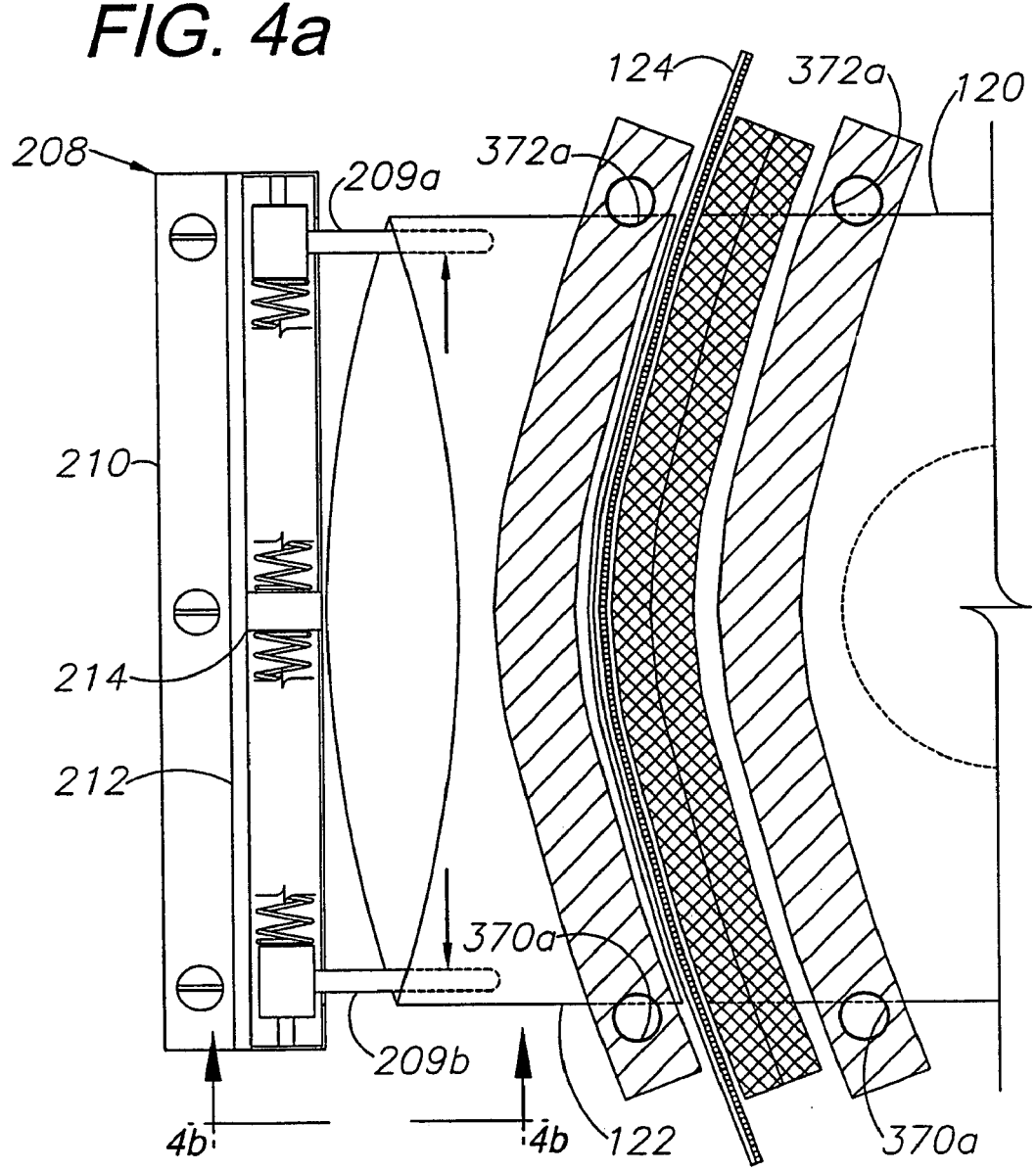
FIG. 4a is a fragmentary, top plan view thereof, particularly showing the sealing bar assembly.

FIG. 4a is a top plan view of the preferred embodiment of the neck retention structure 208. It comprises a pair of pins 209a and 209b that extend outward from a neck retention bracket 210 that holds a guide tube 212 in which the pins 209a,b are urged outwardly by respective springs 214a,b. The pins 209a,b travel along the guide tube 212 during operation of the device. When the bag neck 122 is placed over the engagement gaskets 206, the pins 209a,b are compressed inwardly towards the center of the guide tube 212. Releasing the pins 209a,b stretches the bag opening to its full open, extended position for maximum effective sealing at 122d.

Figure 4B:
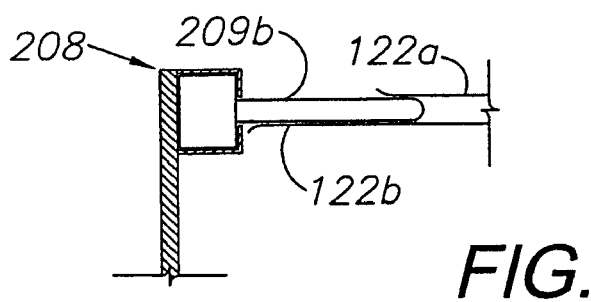

The neck 122 is held open during the sealing process and, as illustrated in FIG. 4a, has just been severed by the cutting blade 124. FIG. 4b is an end view of the neck retention structure 208, including a side view of neck retention pin 209b.

As an alternative to the spring-biased neck retention structure 208, a motorized configuration with a screw-threaded rod driven by a suitable servo motor controlled by the microprocessor controller 222 can be provided and can reciprocate the neck retention pins 209a,b inwardly and outwardly.

Figure 7:
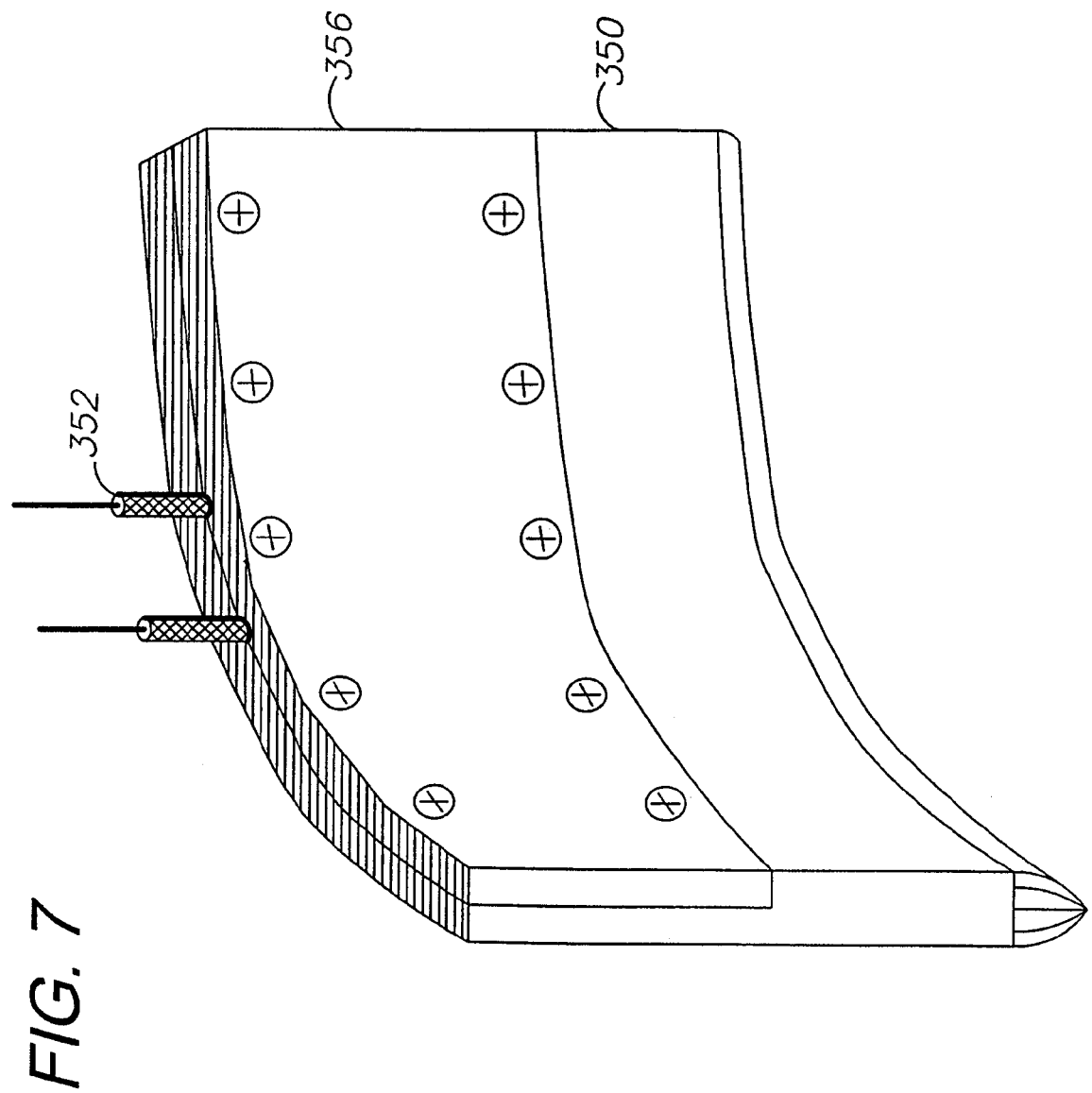
FIG. 7 is an orthographic view of the sealing bar.
Figure 8:
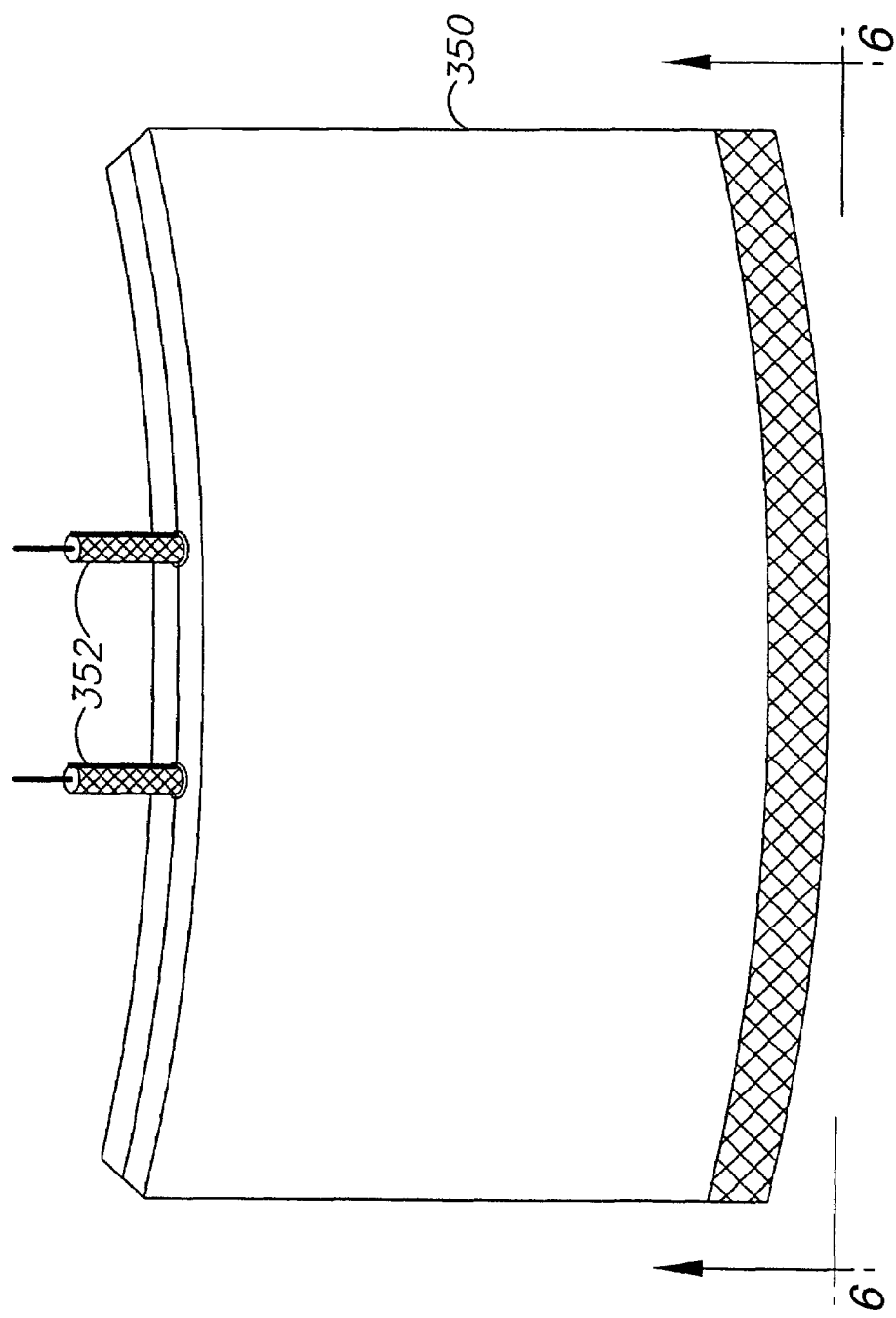
FIG. 8 is an elevational view thereof.

FIG. 5 is an orthographic view of a curved sealing bar 350 with the cover plate removed to show the tubular heating element 352 that provides constant sealing temperature. FIG. 5 also shows the contact surface 354 of the sealing bar 350 designed to provide a cross-hatch pattern when melting the sealed plastic of a vacuum bag 120. FIG. 6 is a bottom view of the sealing bar 350 showing the cross-hatch pattern in greater detail. This cross-hatch pattern permits the device to form a seal through contaminated plastic as well as through gathered layers of plastic created by irregularly shaped products. In particular, multiple, crisscrossed meld lines are formed and tend to cut across contaminated substances and gathered plastic layers, forming multiple barriers to leakage. FIG. 7 is an orthographic view of the sealing bar 350 of FIG. 5 with the cover plate 356 in place. FIG. 8 is an isometric view of the front of the sealing bar 350 with the top portion of the sealing bar tilted slightly toward the viewer.

Figure 9:
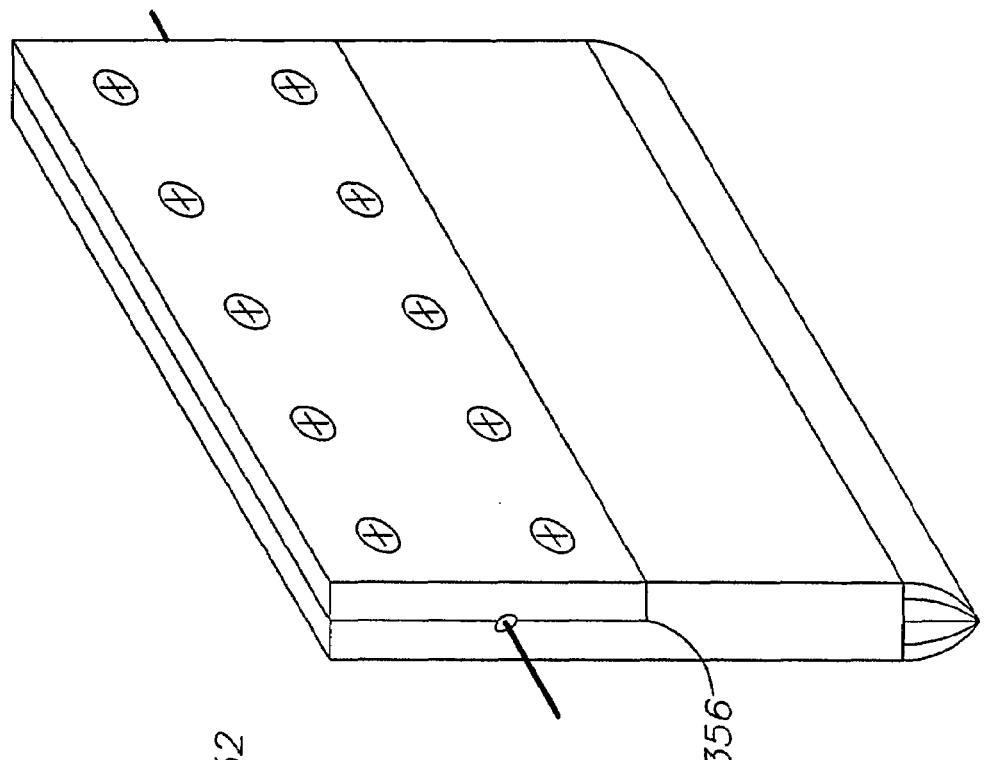
FIG. 9 is an orthographic view of a modified, straight sealing bar, shown with a cover plate removed.
Figure 10:
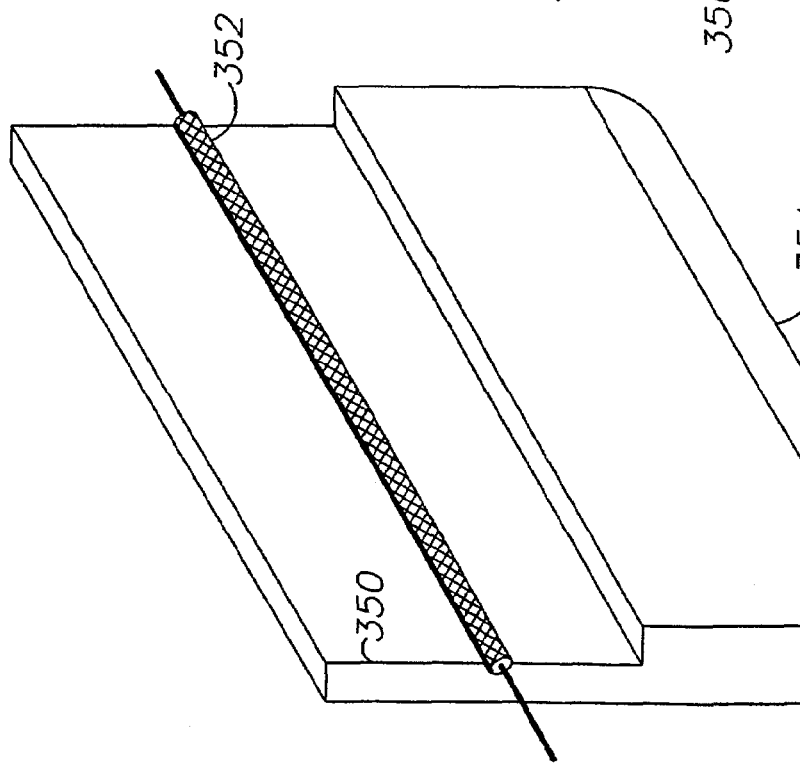
FIG. 10 is an orthographic view of the modified, straight sealing bar.

FIG. 9 is an orthographic view of a straight or linear sealing bar 350 with the cover plate 356 removed to show the straight tubular heating element 352 used to create a constant temperature heat source. The contact surface 354 of the sealing bar 350 shown in FIG. 9 has a cross-hatch pattern. FIG. 10 is an orthographic view of the sealing bar 350 of FIG. 9 with the cover plate 356 in place.

Figure 11:
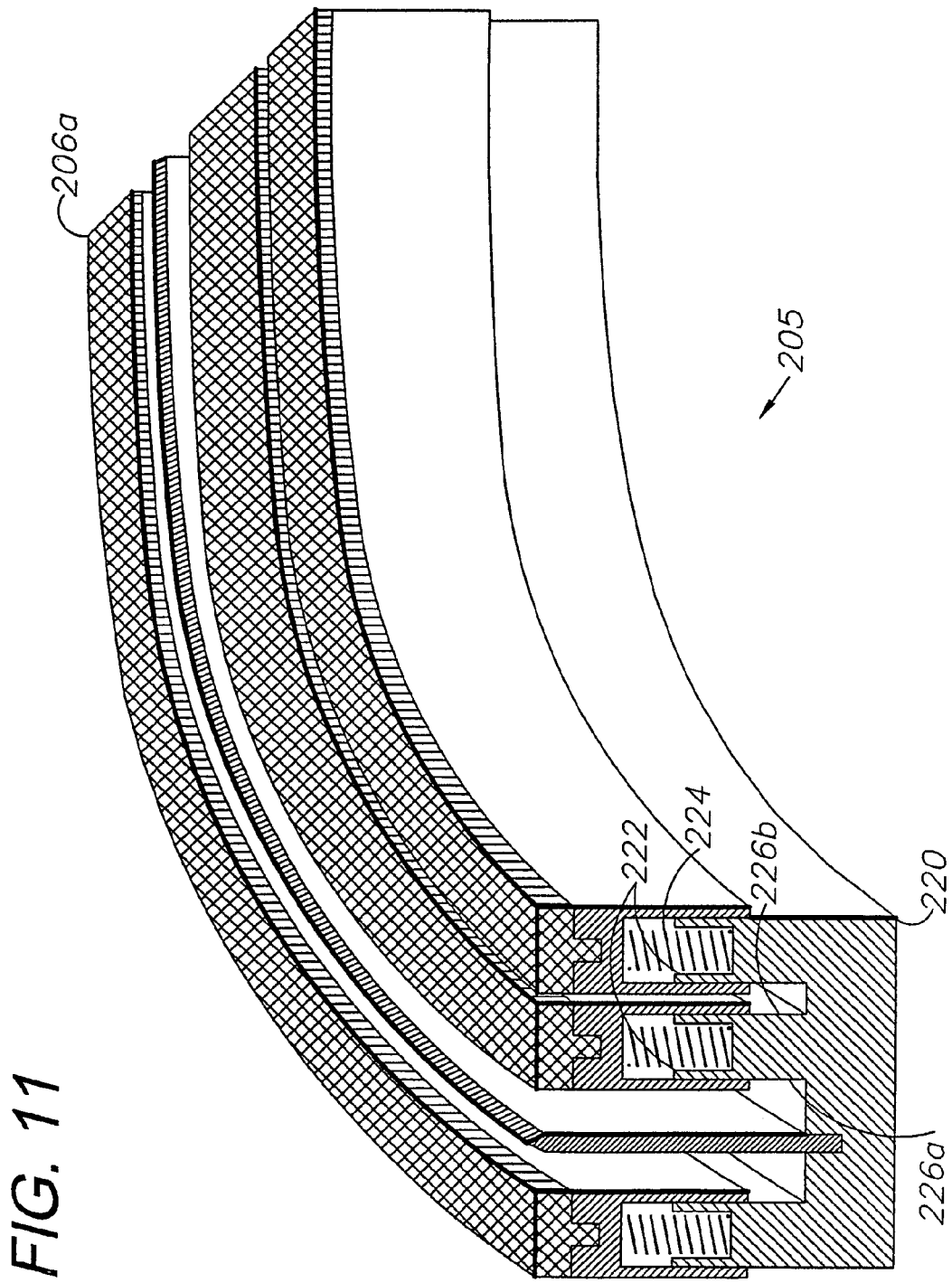
FIG. 11 is an orthographic view of a sealing support assembly.

FIG. 11 is an orthographic view of the sealing support assembly 205 including the engagement gaskets 206a, 206b and 206c, and the bag cutoff blade 124. A sealing support base 220 includes secondary channels 222 for receiving springs 224, a primary major channel 226a within which is mounted the cutoff blade 124, and a secondary major channel 226b which defines and separates engagement gaskets 206b and 206c. The gaskets 206a, 206b and 206c fit over channels 222 and rest upon springs 224. The gaskets 206a, 206b and 206c may include a contact surface having a cross-hatched pattern. The arrangement shown in FIG. 11 would be appropriate for use with a curved sealing bar as shown in FIG. 7.

Figure 12:
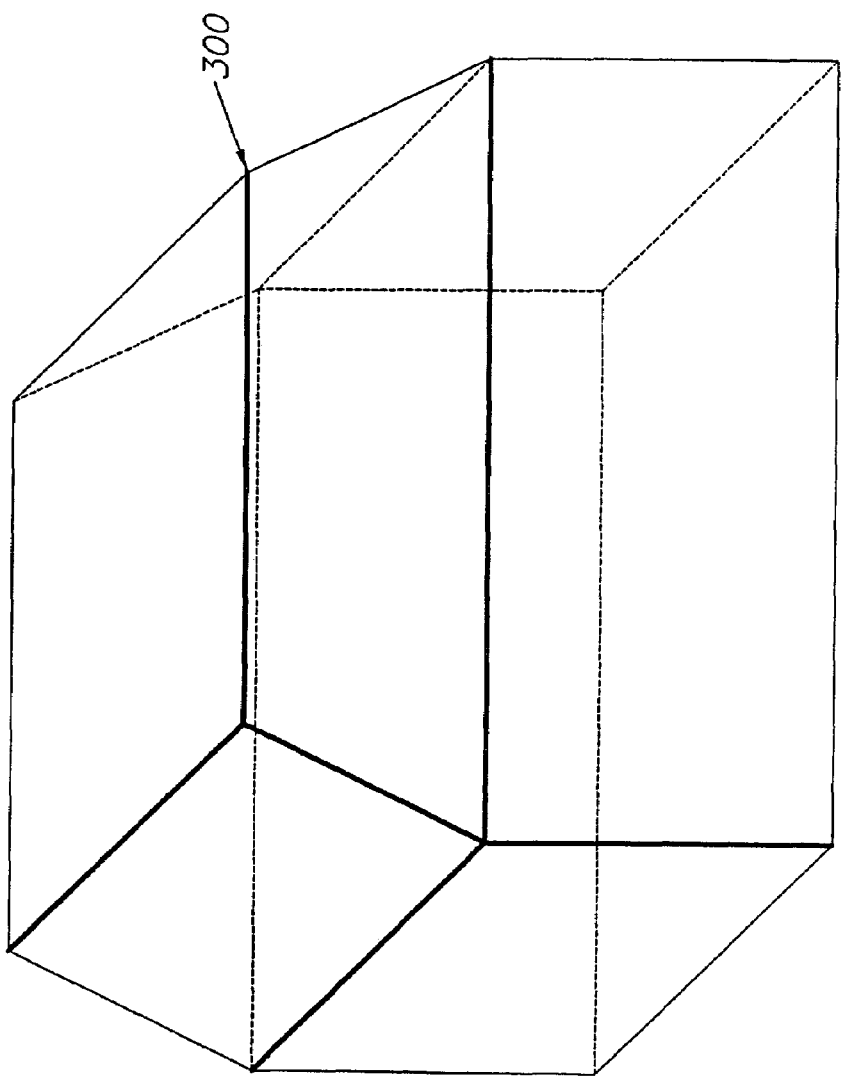
FIG. 12 is orthographic view of a vacuum chamber cover.

FIG. 12 is an upper, front, orthographic view of the vacuum chamber cover 300.

Figure 13:
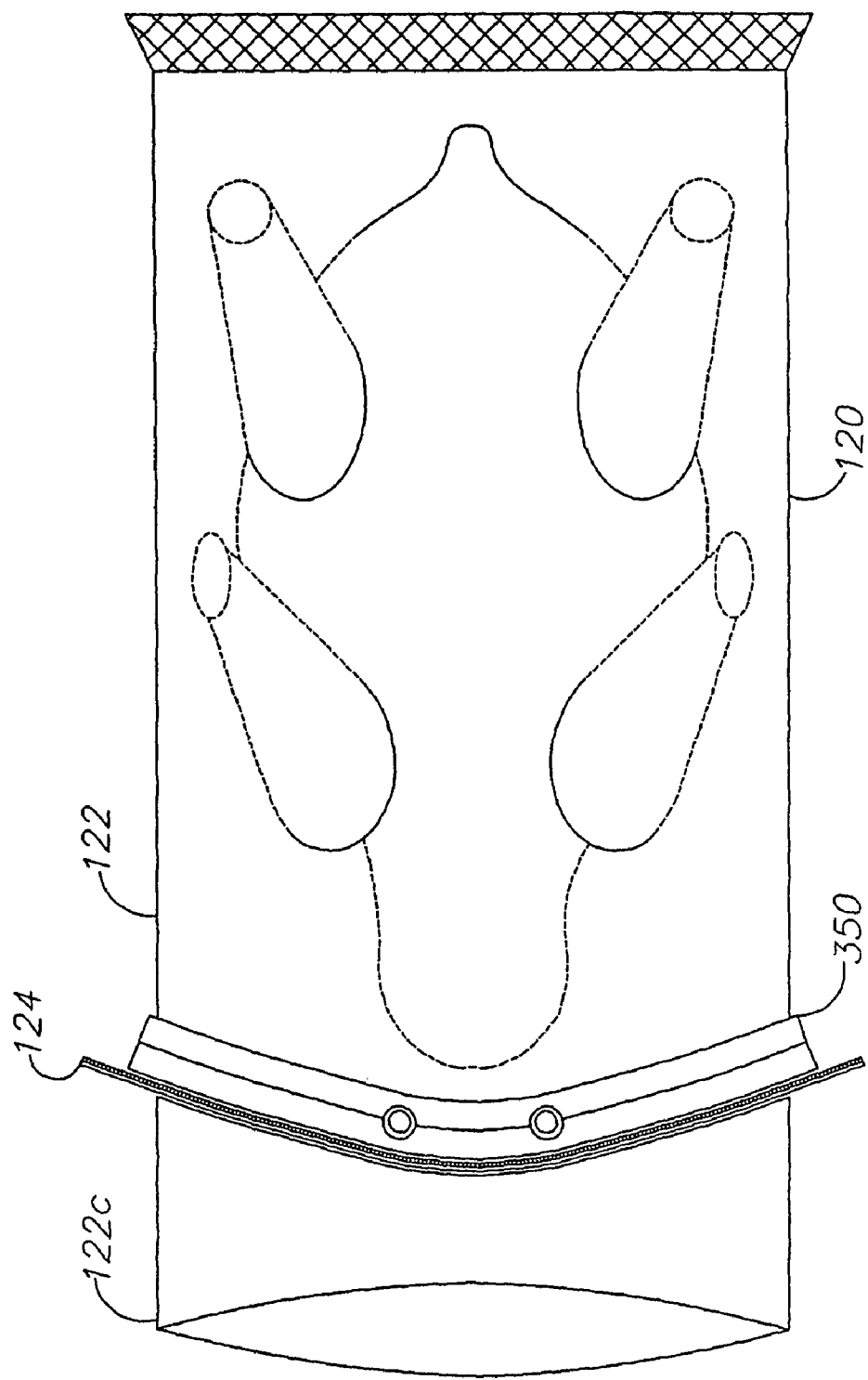
FIG. 13 is a top plan view of a bag containing a poultry carcass, with the sealing bar and cutoff blade shown in position for sealing and cutting off the bag.

FIG. 13 is a fragmentary plan view of the bag 120 containing the item to be packaged 104, the sealing bar 350 positioned above the neck 122 of the bag 120, the cutting blade 124, and a severed portion (remnant) 122c of the neck 122.

Figure 14:
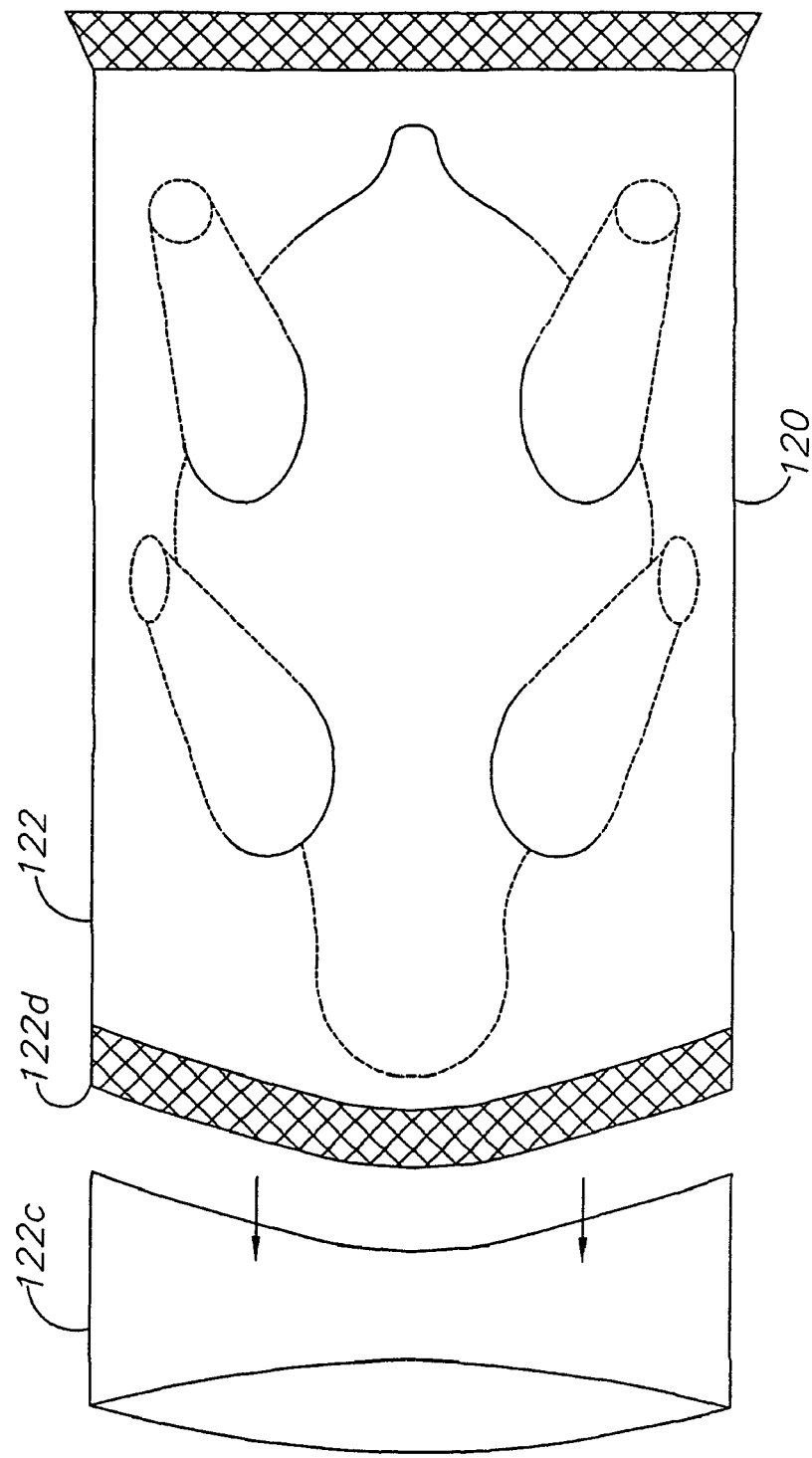
FIG. 14 is a top plan view of the sealed bag.
Figure 15:
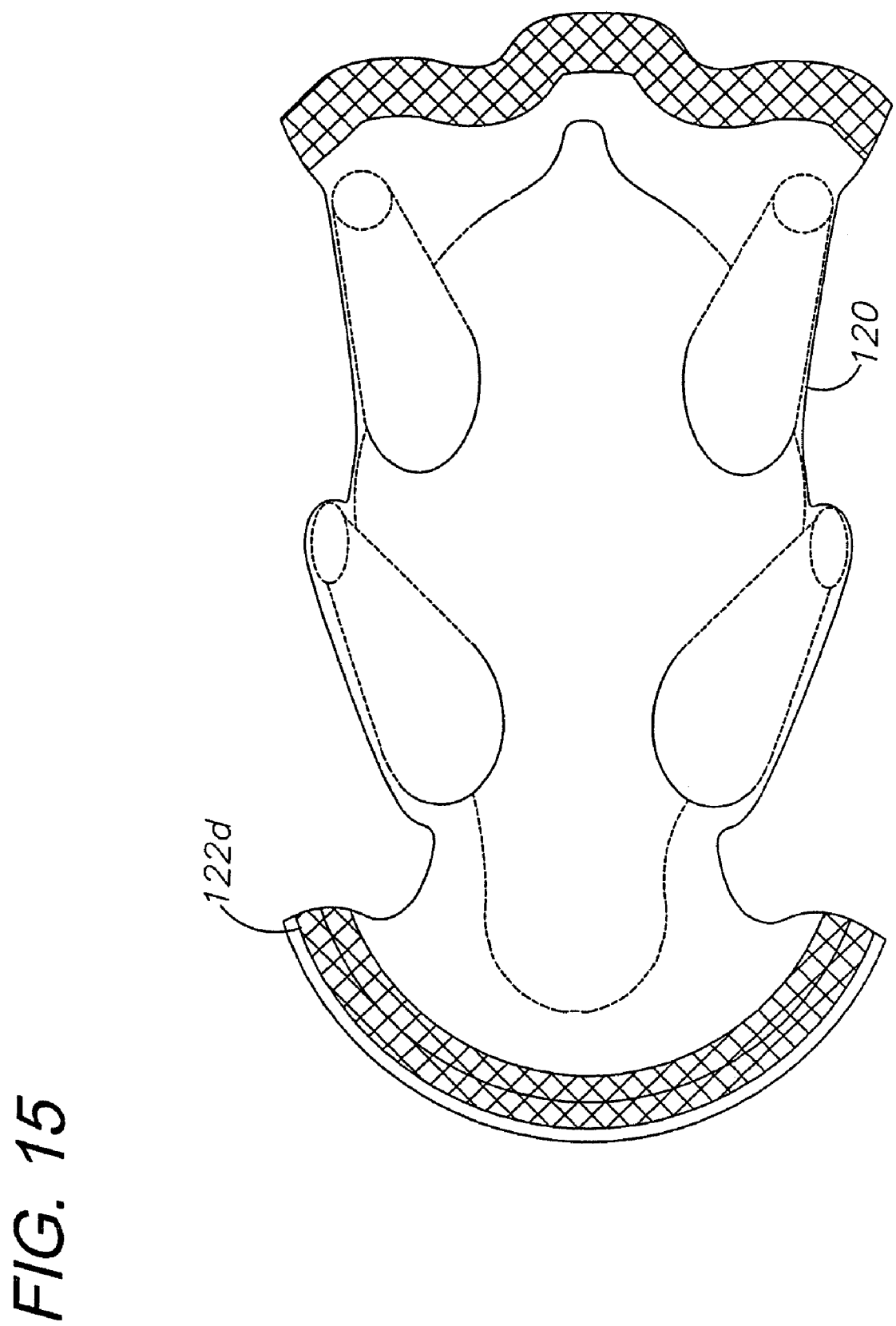
FIG. 15 is a top plan view of the sealed bag, shrunken to its final configuration.

FIG. 14 is a plan view of the bag 120 of FIG. 13 showing the neck remnant 122c severed and removed from the main portion of the bag 120 and the seal 122d formed across the neck 122. After vacuum sealing according to the method of the present invention, a subsequent process occurs in the packaging process. The sealed bag 120 is deposited in a hot water bath or steam tunnel causing the thermoplastic material of the bag 120 to shrink as illustrated in FIG. 15.

Figure 16:
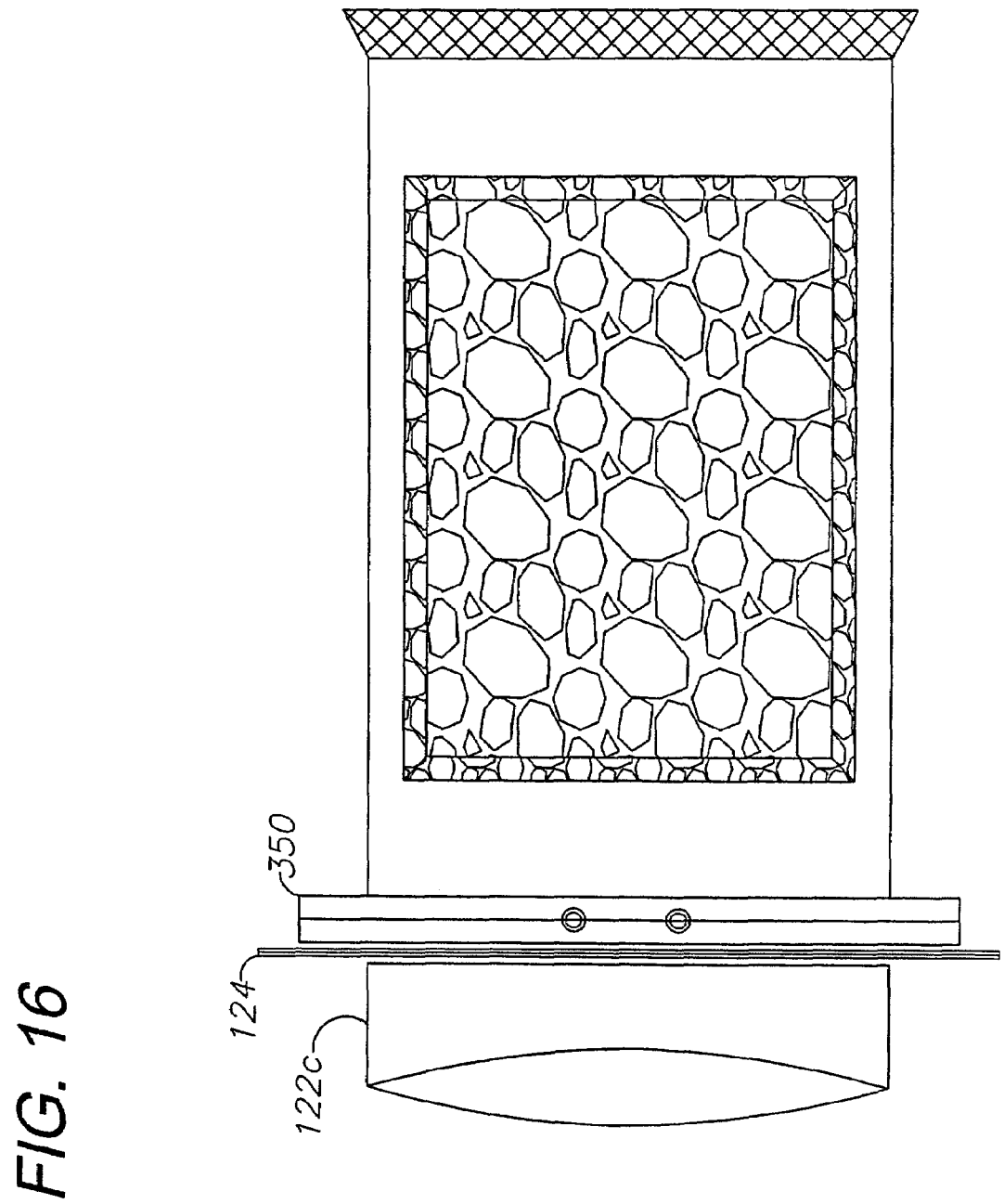
FIG. 16 is a top plan view of a rectangular product, such as a block of cheese, shown in a bag with a seal bar and cutoff blade shown in position for sealing and cutting off the bag.
Figure 17:
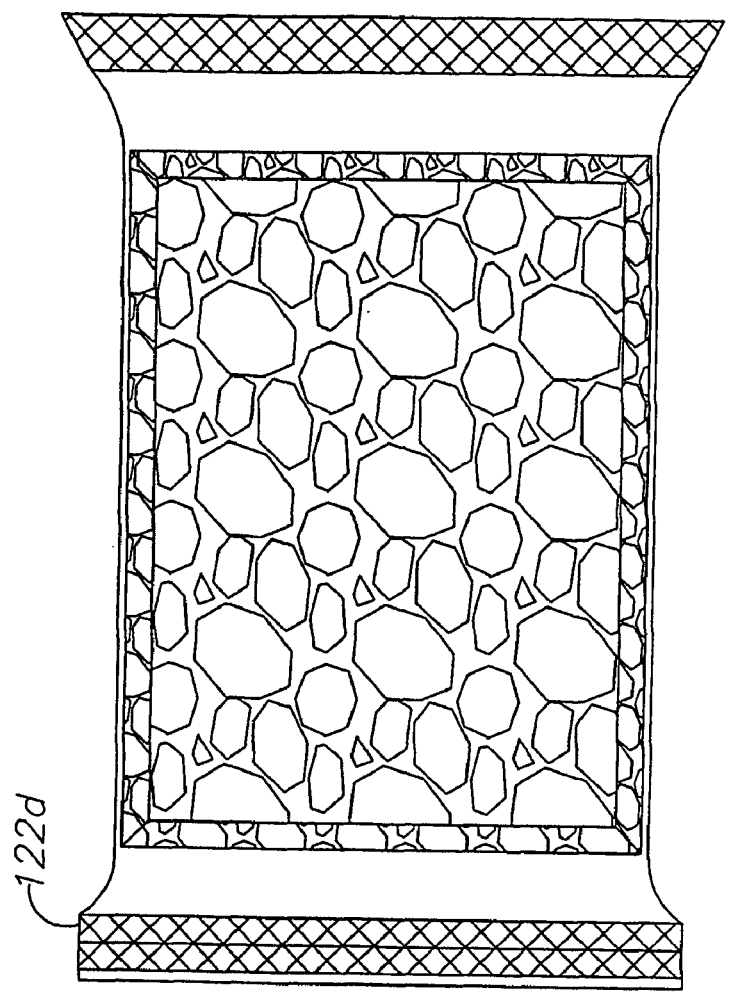
FIG. 17 is a top plan view thereof, showing the bag sealed.

FIG. 16 is a fragmentary plan view of an alternative configuration sealing bar 350. In this embodiment the sealing bar 350 is straight rather than curved as is the cutoff blade 124. The embodiment shown in FIG. 16 is advantageous for use with rectangular shaped items, such as the cheese block shown. FIG. 17 is a top view of the bag 120 of FIG. 16 with a portion of the neck 122 removed after vacuum sealing and with the bag 120 shrunk after hot water immersion.

Figure 18A:
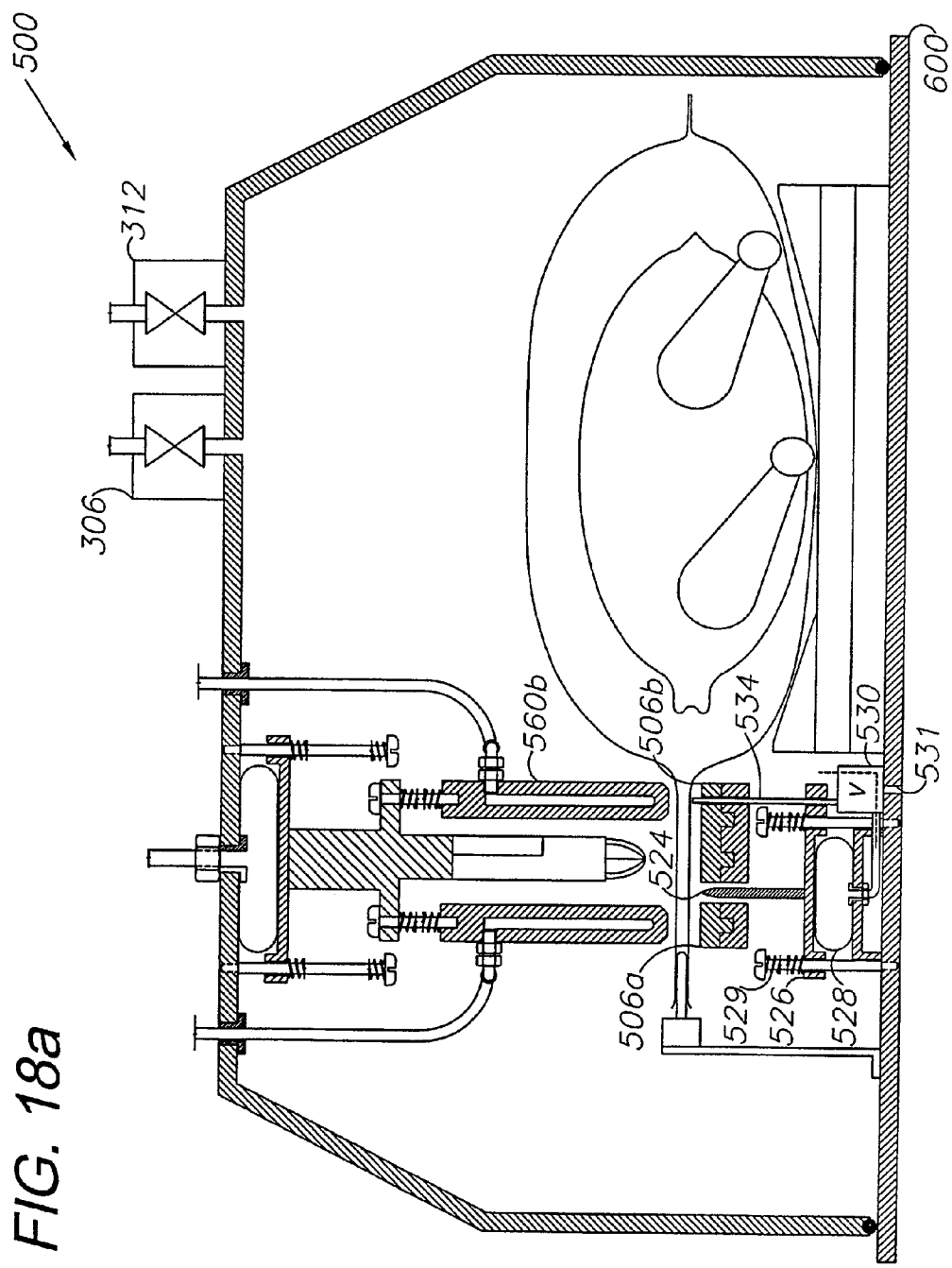
FIG. 18a is a longitudinal cross-section of a modified embodiment bag sealing unit with a modified cutoff knife assembly.
Figure 18B:
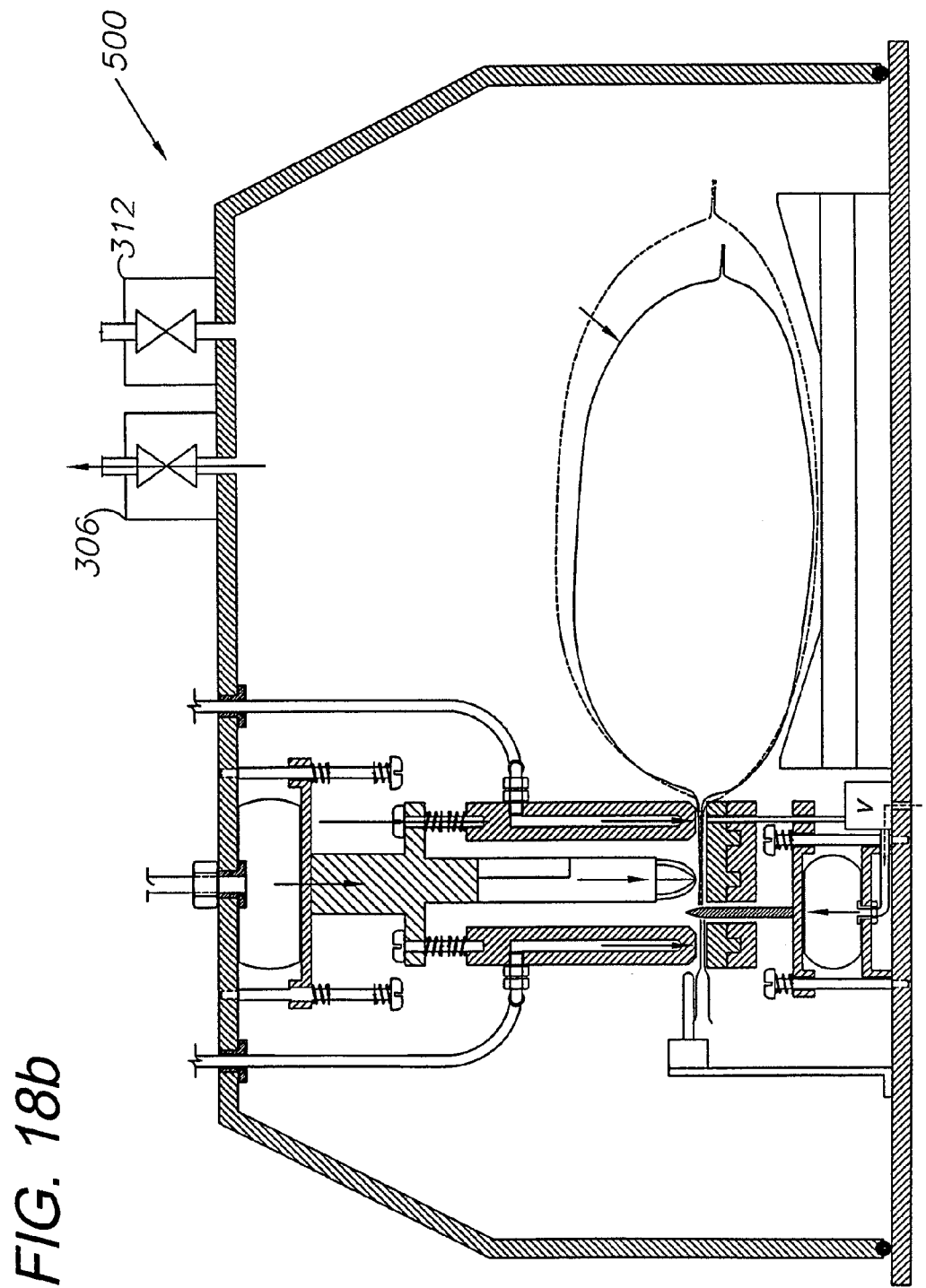
FIG. 18b is a longitudinal cross-section thereof, showing the sealing bar and the cooling plates in their lowered, engaged positions.
Figure 18C:
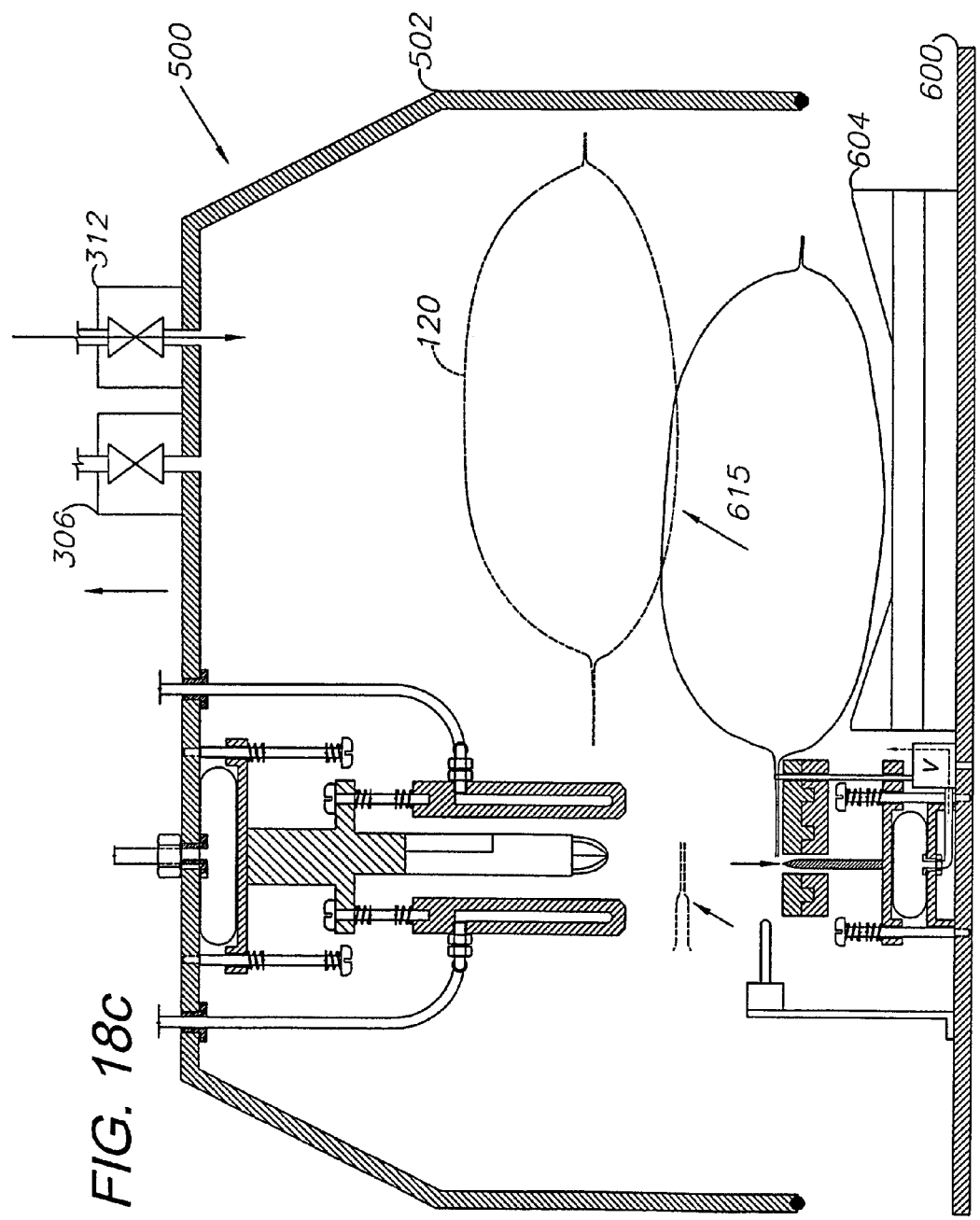
FIG. 18c is a longitudinal cross-section section thereof, showing the vacuum cover raised and the bagged product being removed.

FIGS. 18a-c illustrate an alternative embodiment of the vacuum packaging machine 500. By way of example, the illustrated embodiment differs from that illustrated in FIGS. 2a through 2c primarily in that the engagement gaskets 506a,b are fixed rather than spring-biased. Also, the cutoff blade 524 is movable rather than fixed and is mounted on a cutoff blade platform 526 mounted on bolts 528 with springs 529 biasing the cutoff blade platform 526 downwardly.

The platform 526 and the associated cutting blade 524 are moved upward during the cutting operation by means of a secondary bladder 528. Air supply to the secondary bladder 528 is regulated by a three-way valve 530. The valve 530 is activated by a pin 534. During operation of the vacuum packaging machine 500, the pin 534 is depressed by the descending cooling plate 560b. The pin 534 moves downward through the platform 526 and activates the valve 530 causing the bladder 528 to be opened to ambient air pressure outside the vacuum chamber 500 through a vent opening 531 formed in the platen 600. Due to the pressure differential between the outside (ambient) pressure and the partial vacuum within the chamber 500, the secondary bladder 528 fills with outside air, pushing the platform 526 and the cutoff blade 524 upward, and severing the neck 122 of the bag 120 as shown in FIG. 18b.

Upon activation of the vent valve 312, the chamber 500 returns to ambient atmospheric pressure, and the secondary bladder 528 is deflated by downward pressure from the platform 526 as exerted by springs 529. FIG. 18c illustrates the vacuum packaging machine 500 at the conclusion of the cycle. The cover 502 has been lifted off the platen 600 and the sealed bag 120 is shown being removed from the cradle 604. Arrow 615 indicates the upward direction of travel of the bag 120 as it is being removed.

Figure 19:
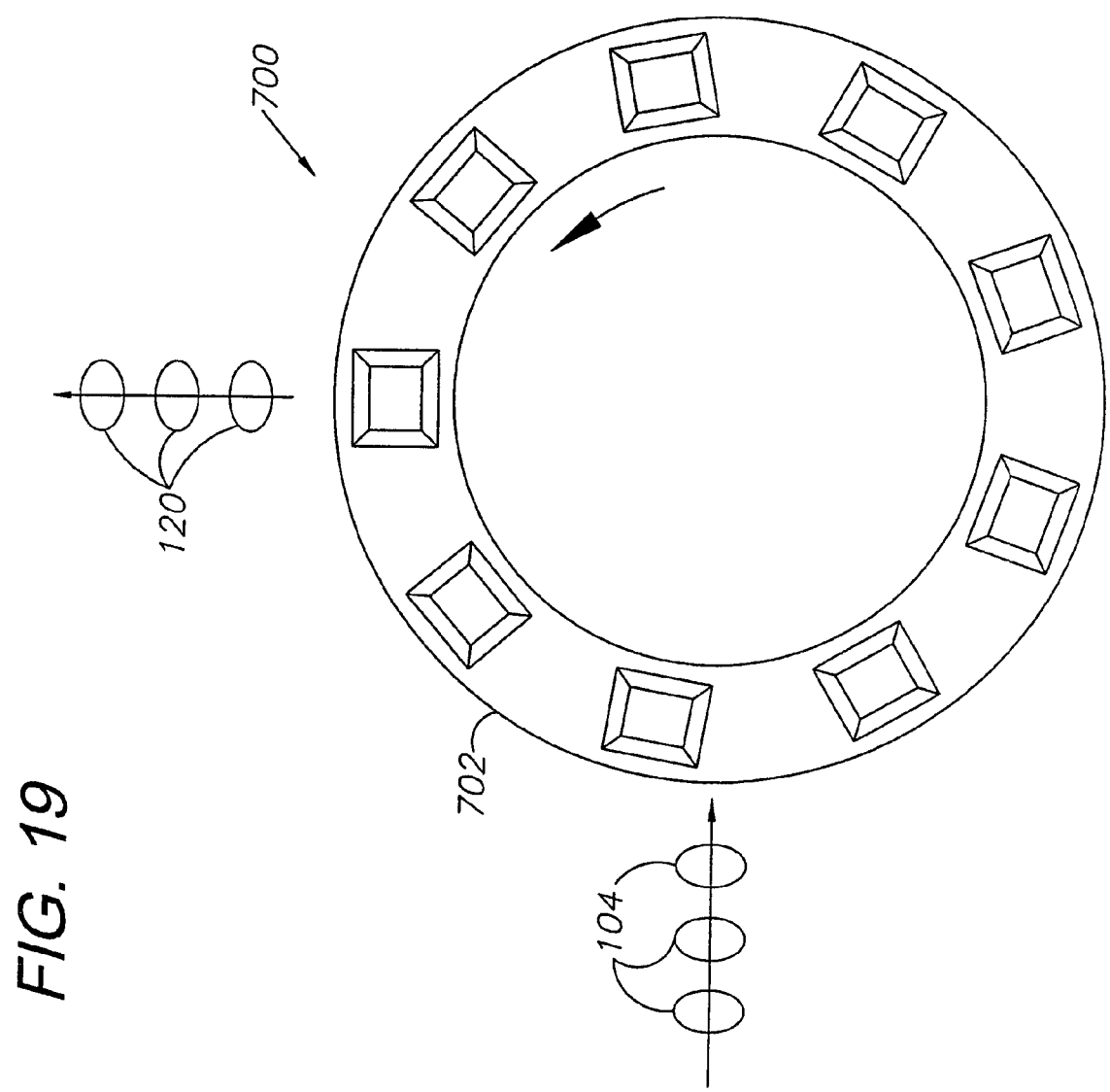
FIG. 19 is a top plan view of a circular, carousel-type bag sealing system.
Figure 20:
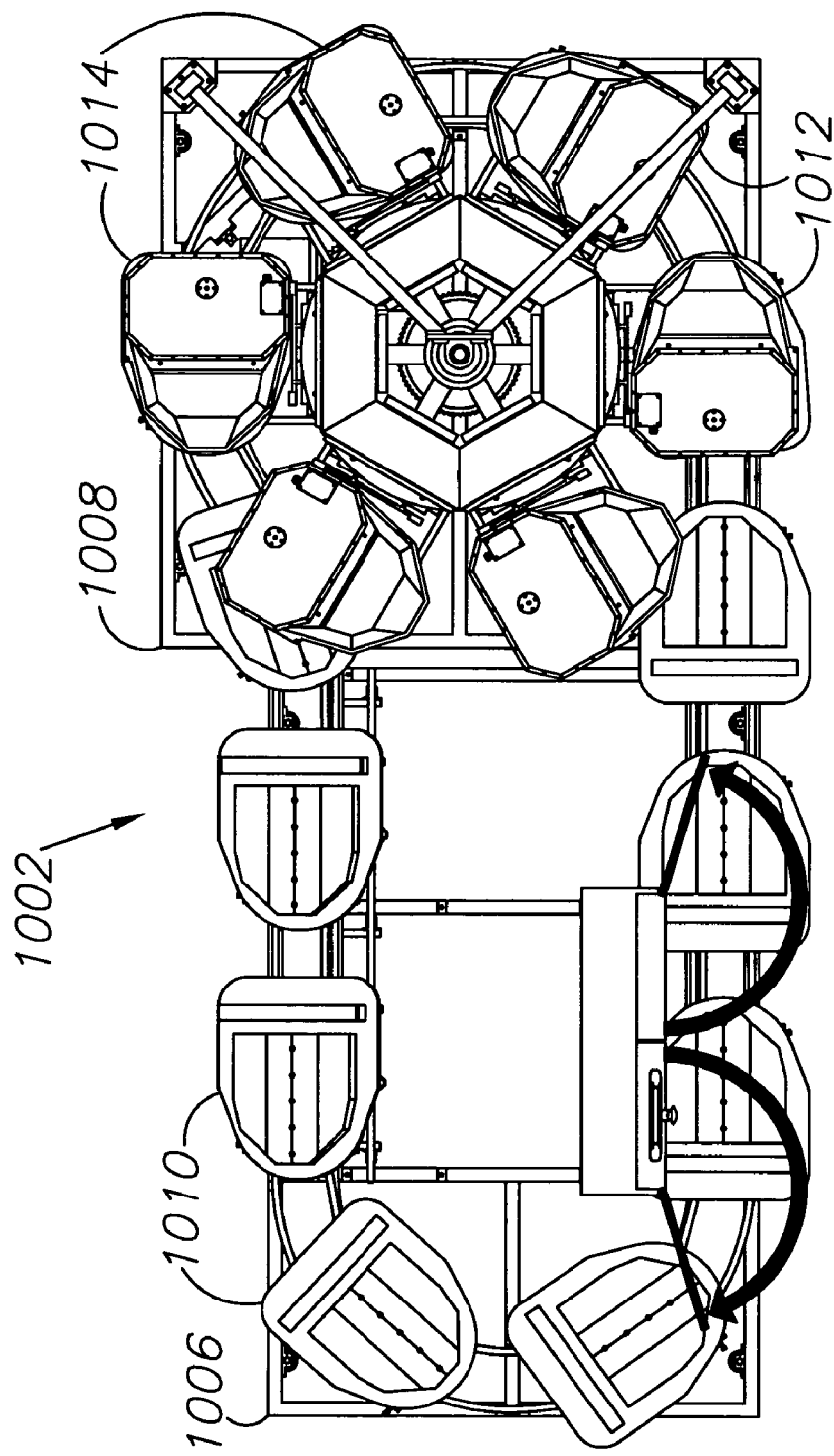
FIG. 20 is a plan view of a bag sealing system comprising an alternative embodiment of the present invention.

FIG. 19 shows an alternative configuration rotary chamber system 700 comprising a circular conveyor 702 with multiple bag sealing units 106 mounted thereon in radially-spaced relation. The conveyor 702 is rotated by a motor whereby the bag sealing units 106 perform sealing operations at appropriate workstations for different steps of the process.

The components of the system 100 are preferably constructed of suitable materials, such as stainless-steel or aluminum, which can accommodate power washing for cleaning purposes and tend to resist rust and corrosion in working environments with relatively high humidity and temperature levels.

Figure 21:
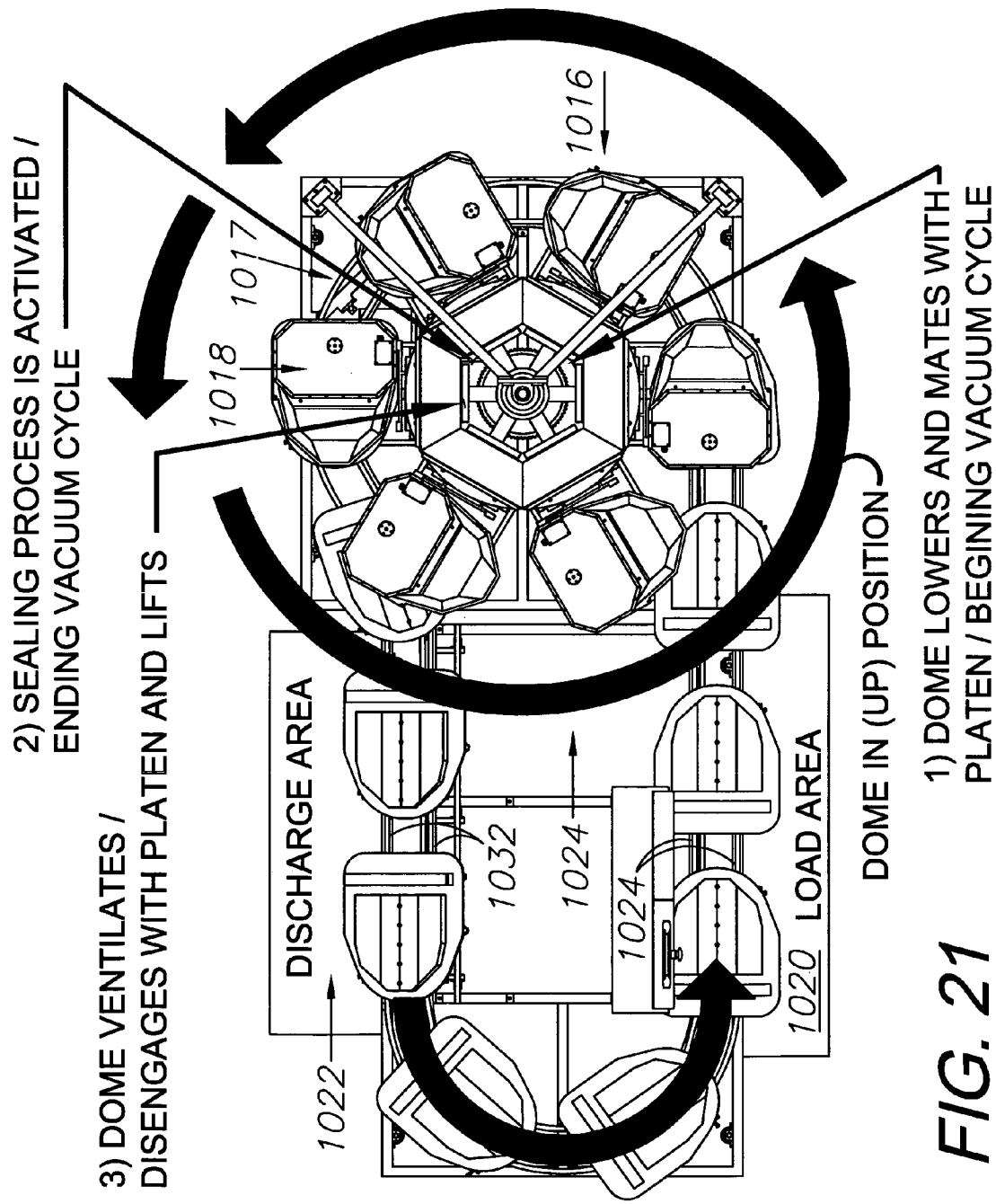
FIG. 21 is another plan view thereof, showing various stations corresponding to the steps of the bag sealing method of the present invention.
Figure 22:
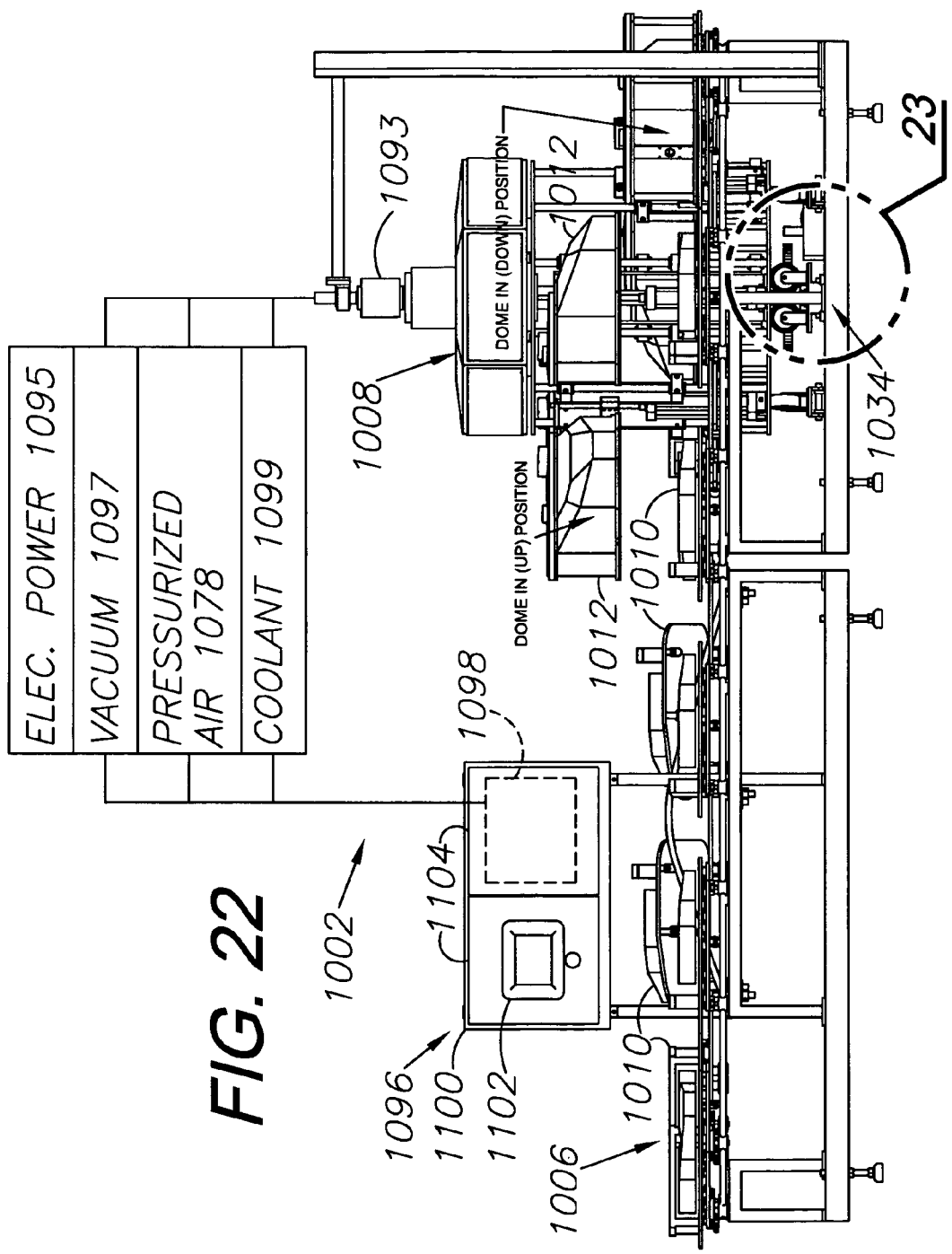
FIG. 22 is a side elevational view thereof.

Another alternative embodiment bag sealing system is shown in FIGS. 20-27 and is generally designated by the reference numeral 1002. The system 1002 generally includes a conveyor subsystem 1004, which comprises a platen conveyor 1006 with a plan configuration defining a platen travel path generally in the shape of a racetrack or a rounded oblong, and a carousel-type dome conveyor 1008. The dome conveyor 1008 has a generally circular plan configuration defining a circular dome travel path, which is generally located in a horizontal plane above the level of a horizontal plane generally containing the platen conveyor 1006. The platen conveyor 1006 mounts a number of platens 1010, which selectively receive respective domes 1012 suspended from the dome conveyor 1008 whereby bag sealing units 1014 are combined temporarily through vacuum and sealing stations 1016, 1018 (FIG. 21). The platen conveyor 1006 also includes loading and discharge stations 1020, 1022. The dome conveyor 1008 also includes a dome-up station 1024. The bag sealing units 1014 are combined through the vacuum and sealing stations 1016, 1018, and separate into disconnected platens 1010 and domes 1012 through the other conveyor stations.

Although particular configurations and types of conveyors are shown and described by way of examples, various configurations and types of conveyors can be utilized with the present invention. Thus, the platens 1010 are rollingy placed on tracks 1026 on the platen conveyor 1006. At the loading station 1020, an unsealed bag 1028 containing an object 1030 is placed on each platen 1010. The loading station 1020 can be supplied with a suitable supply conveyor (not shown) for automatic loading of the platens 1010, or the bagged objects 1030 can be placed thereon manually.

The loaded platens 1010 next proceed towards the dome carousel 1008 and into alignment underneath respective domes 1012. The platen conveyor 1006 passes beneath the dome conveyor 1008 at approximately the location where the vacuum station 1016 commences. The bags 1028 are evacuated through the vacuum station 1016, as described above. At the sealing station 1017 the bags 1028 are sealed and the bag sealing units 1014 proceed to the ventilation station 1018 whereat the domes 1012 are ventilated and lifted from the platens 1010. The platens 1010 next proceed to the discharge station 1022 whereat the sealed items can be discharged by any suitable mechanism, including without limitation manual, semi automatic and automatic. The rails 1026 of the platen conveyor 1006 deflect upwardly at 1032 and thereby tilt the platens 1010 for sloping downwardly and outwardly and discharging the bagged items therefrom at the discharge station 1022.

Figure 23:
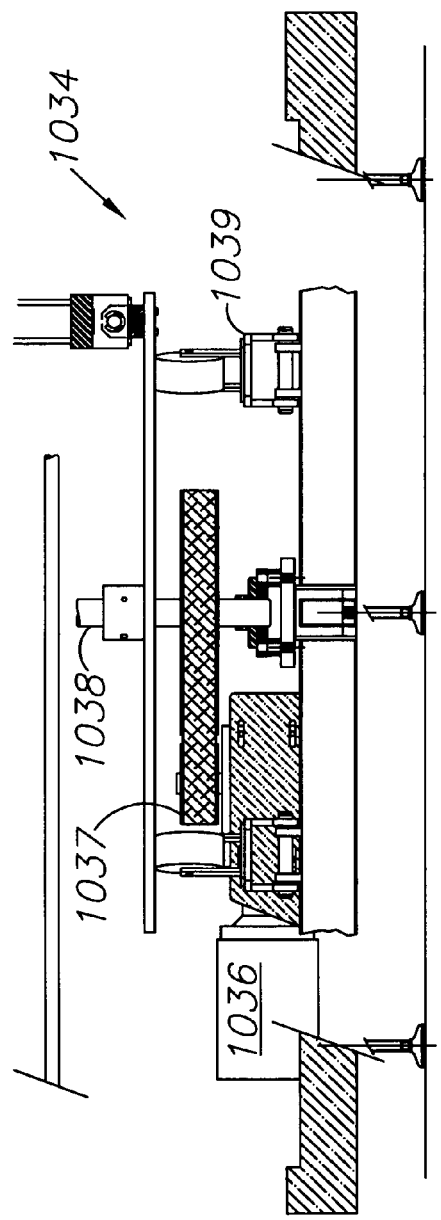
FIG. 23 is an enlarged, fragmentary, side elevational view taken generally within circle 23 in FIG. 22, and particularly showing a drive mechanism.

A drive mechanism 1034 is shown in FIG. 23 and generally includes a drive motor and gearbox 1036 driving a main drive shaft or live axle 1038 through a belt drive assembly 1040. The carousel-configuration in dome conveyor 1008 is supported by multiple casters 1042, whereby the dome conveyor 1008 rotates about a drive axis extending through the main drive shaft 1038.

Each platen 1010 includes a base 1040 with an upper surface 1042 mounting an item support 1044 adapted to receive a bagged items 1030 and a neck support 1046 adapted to receive necks 1048 of respective bags 1028. The neck support 1046 includes a resilient contact service 1050, which can be mounted on springs are comprises a compressible material in order to provide resiliency. A ridge 1052 is located on top of the contact surface 1050.

Each dome 1012 includes a top 1060, a perimeter sidewall 1062 with a lower edge 1064 mounting a perimeter sealing gasket 1066 adapted for forming a sealing engagement with the base upper surface 1042. A sealing assembly 1068 is mounted on the underside of the top 1060 generally within a vacuum chamber 1070 formed by the dome 1012. The sealing assembly 1068 includes a pneumatic raise/lower actuating mechanism 1072 with a bladder 1074 connected to an air inlet port 1076, which in turn can be connected to a pressurized air source 1078, such as a compressor or a packaging plant air source.

Figure 24:
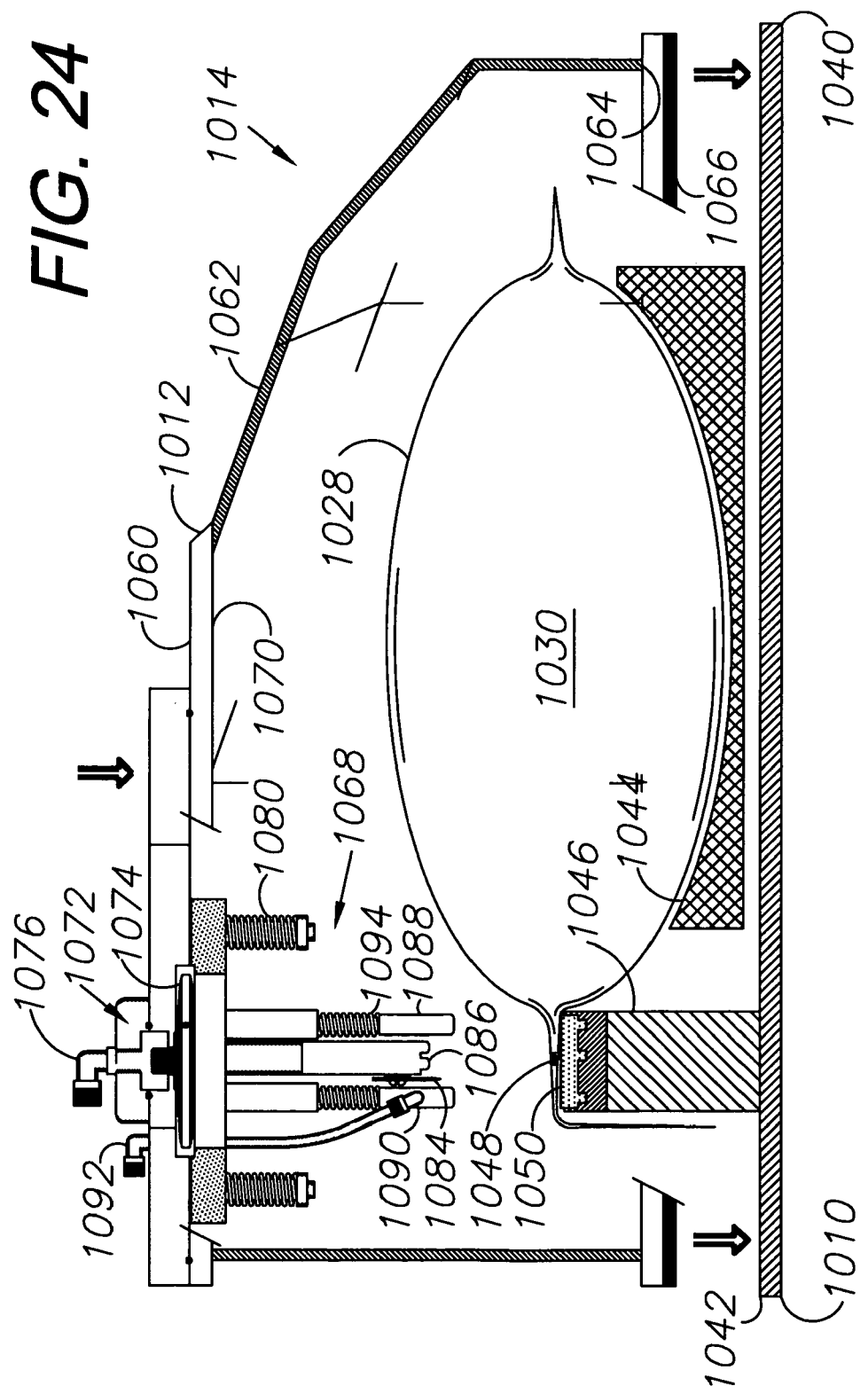
FIG. 24 is an enlarged, vertical, cross-sectional view of a bag sealing unit, with a dome thereof in its raised position.
Figure 25:
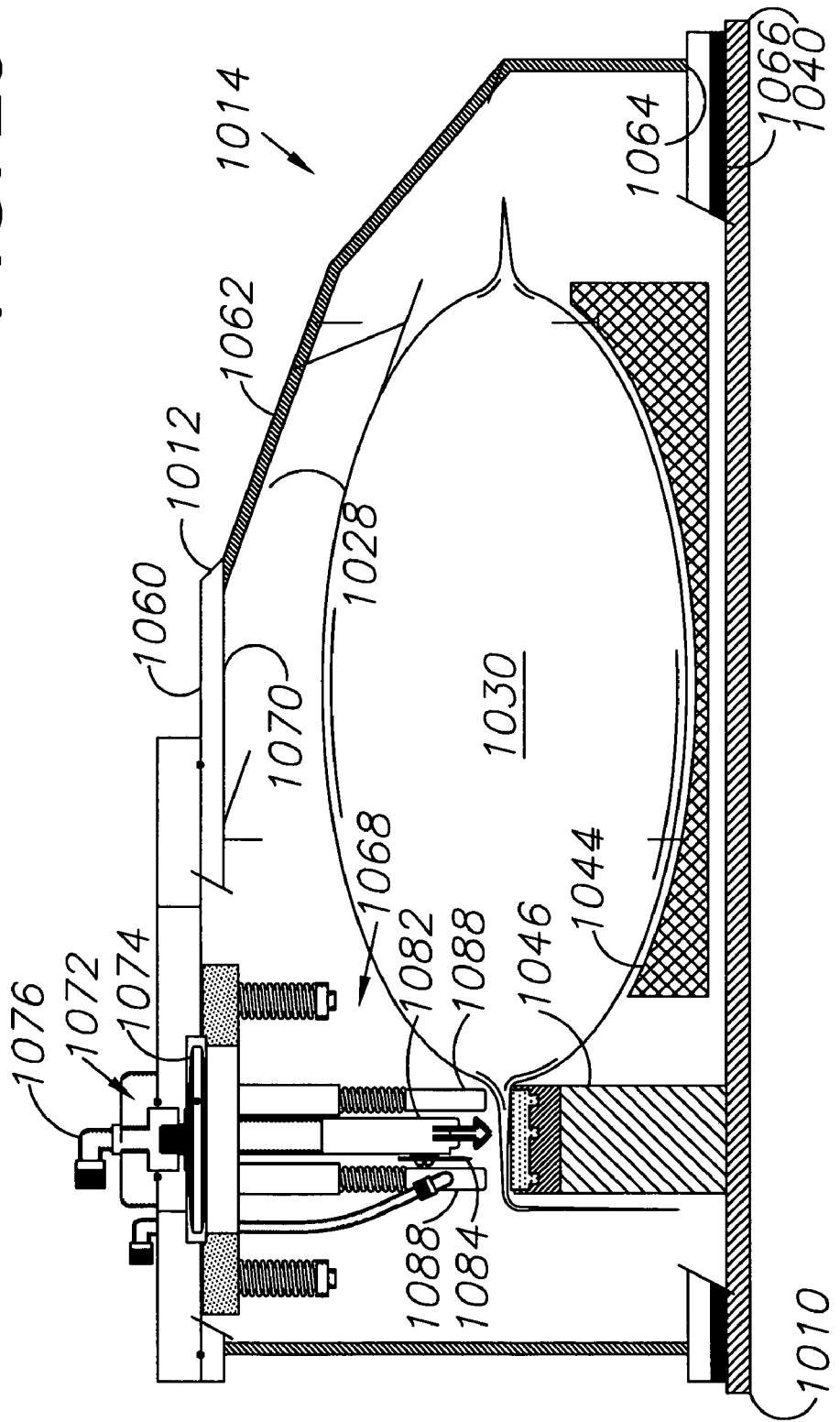
FIG. 25 is an enlarged, vertical, cross-sectional view thereof, with the dome in its lowered position.
Figure 26:
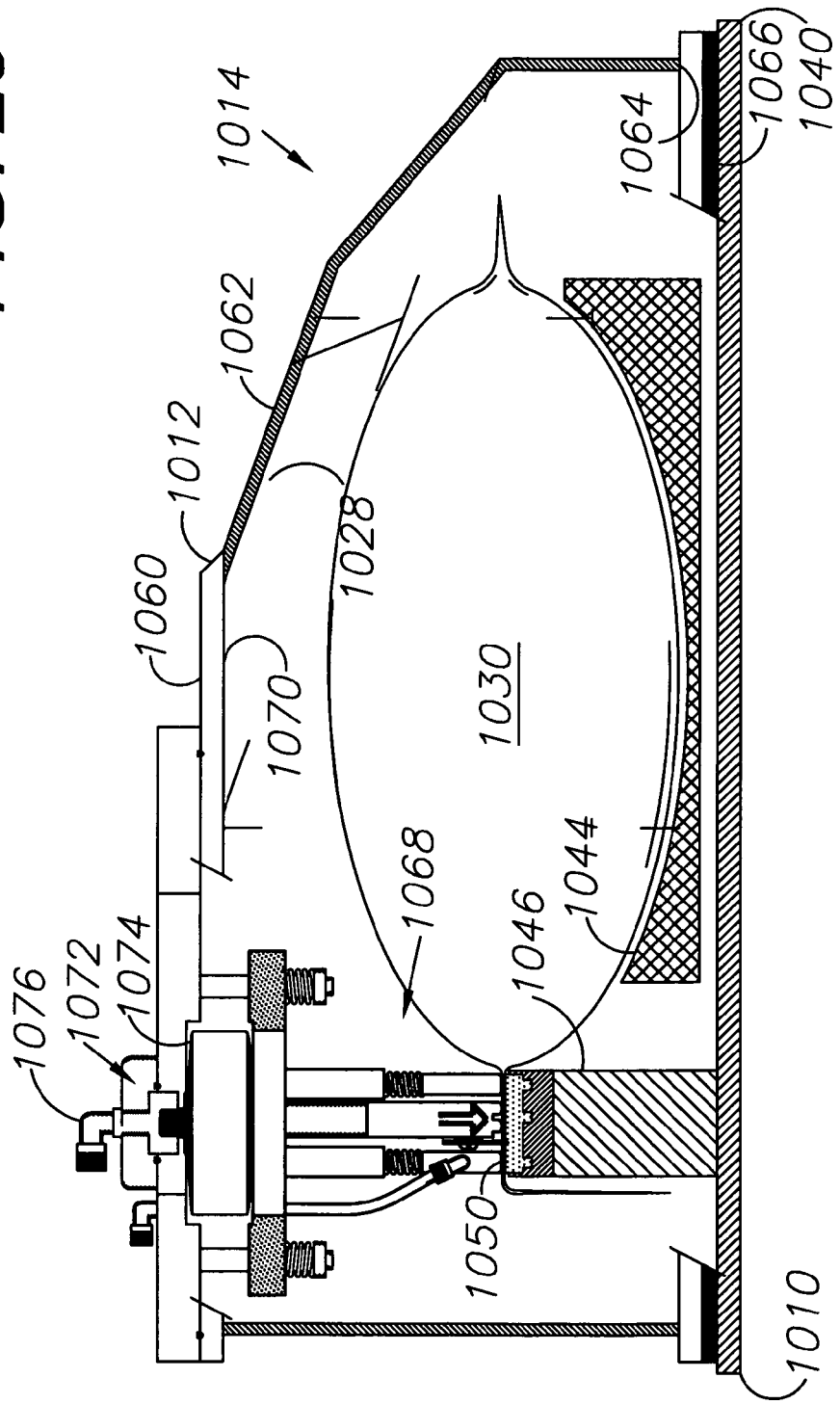
FIG. 26 is an enlarged, vertical, cross-sectional view thereof, with the dome and a sealing assembly thereof in their lowered positions for sealing a bag neck.
Figure 27:
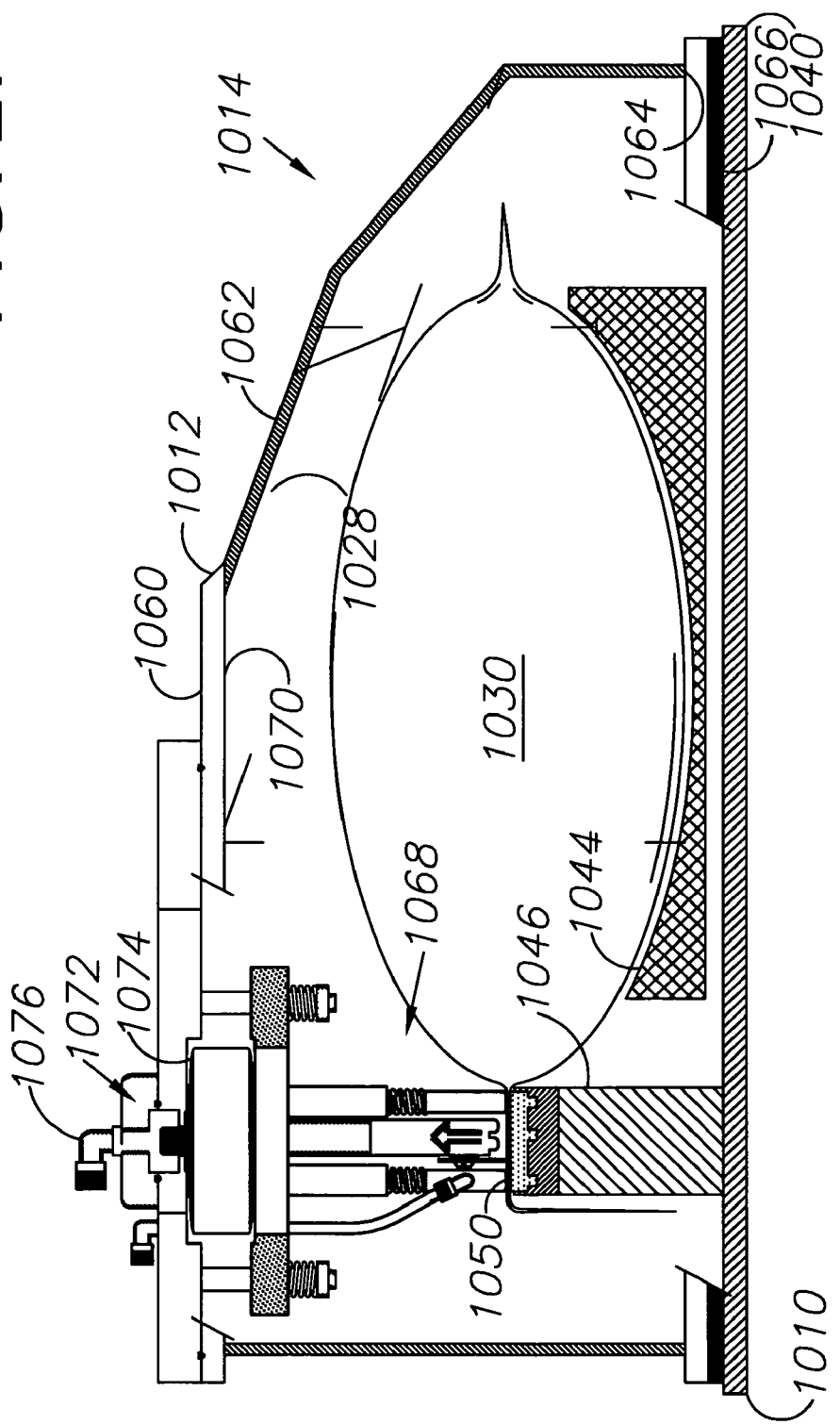
FIG. 27 is an enlarged, vertical, cross-sectional view thereof, showing the sealing bar slightly lifted above the bag neck.

Return springs 1080 are provided for returning the raise/lower actuating mechanism 1072 to its raised position, e.g. when the bladder 1074 is deflated. The actuating mechanism 1072 includes a seal bar 1082 adapted for constant high-temperature operation, e.g. with nichrome electrical resistance heating elements, as described above. Without limitation on the generality of useful heat sources, other types such as circulating liquid, combustion, resistance heating, infrared, etc. could be provided. The seal bar 1082 mounts a cut-off blade 1084, which protrudes slightly below a lower contact surface 1086 of the seal bar 1082. The seal bar 1082 is located between a pair of heat-sink cooling bars 1088, each of which includes coolant passages for receiving and circulating coolant, which enters and exits through cooling bar coolant ports 1090 connected to sealing assembly coolant inlet ports 1092. The cooling bars 1088 are biased downwardly by compression springs 1094, which compress the bag neck 1048 against the gasket 1050 for sealing. As shown in FIG. 24, the cooling bars 1088 normally extend below the level of the seal bar lower contact surface 1086, whereby they function as heat sinks absorbing the heat generated by the seal bar 1082. The entire sealing assembly 1068 is thus maintained at a relatively low temperature. The seal bar 1082 can be maintained at a constant temperature because exposure to the plastic bag neck 1048 only occurs in the sealing position, with the seal bar 1082 at its lowermost position relative to the cooling bars 1088 (FIG. 26). In this position, which corresponds to the activation of the sealing process at station 1017, the seal bar lower contact surface 1086 is in close proximity to the compressed double plastic layers forming the bag neck 1048, which are thermally welded and sealed. The cut-off blade 1084 separates a neck cut-off portion 1049, which can be discarded. The seal bar 1082 is then slightly raised to the position shown in FIG. 27, with its lower contact surface 1086 position slightly above the bag neck 1048 whereby the welded seam 1087 is allowed to cool or set, generally for about 0.1 to about 0.5 seconds.

Figure 28:
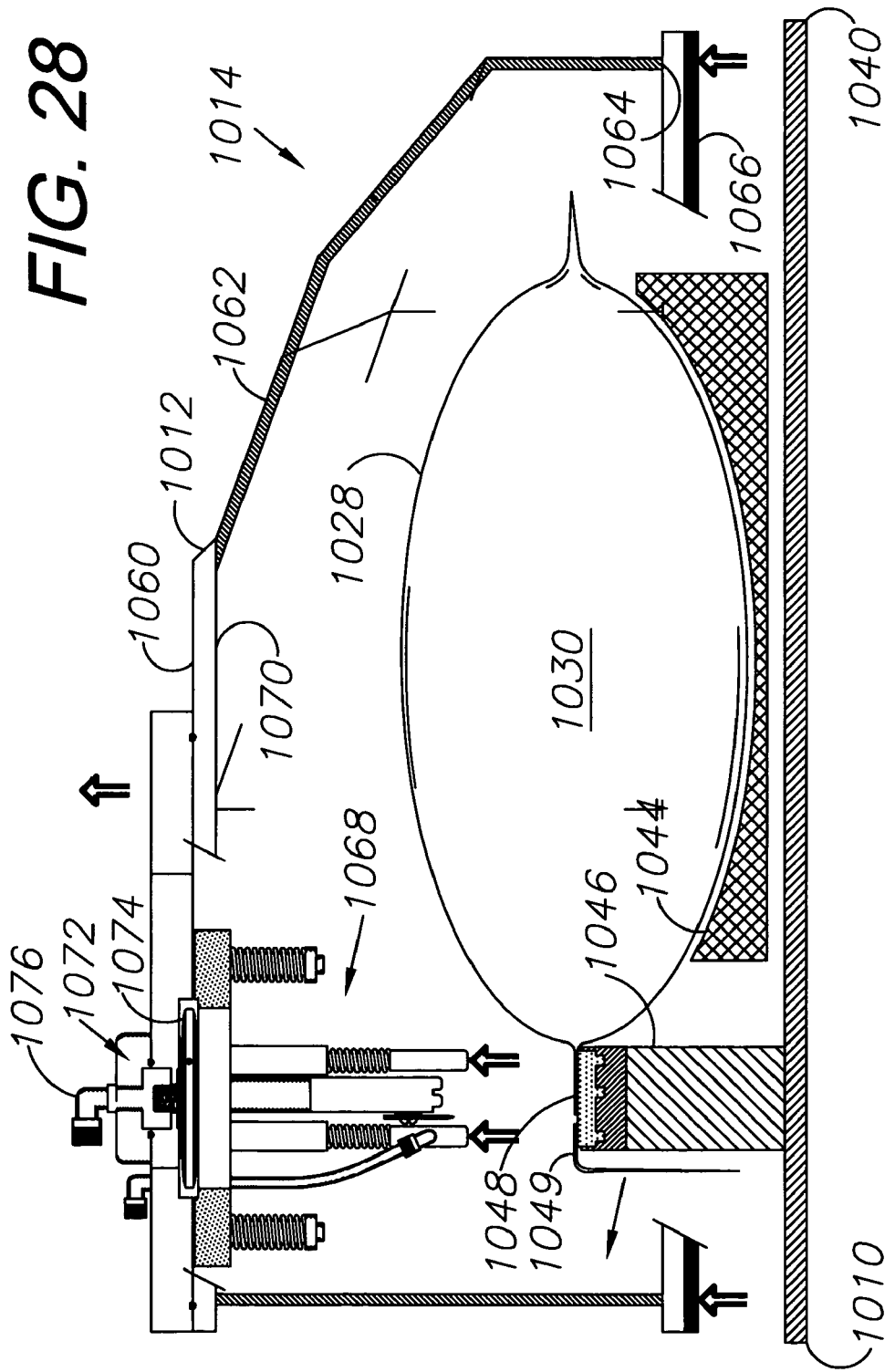
FIG. 28 is an enlarged, vertical, cross-sectional view thereof, showing the dome and the sealing assembly in their raised position, with the bag neck sealed.

The process is completed by retracting the actuating mechanism 1072 to its fully-raised position (FIG. 28). The dome 1008 is lifted from the platen 1006 and the latter, with the vacuum-packaged product 1030 thereon, proceeds to the discharge station 1022. Various additional steps and processes can be included in the method of the present invention and performed with appropriate modifications to the system of the present invention. For example, in food-handling operations certain procedures may be needed in order to maintain sanitary conditions. These can include washing and otherwise cleaning and sterilizing the equipment, which can comprise stainless steel or other suitable construction with desired characteristics such as resistance to rust and corrosion. Moreover, additional operations can be performed on the packaged products, such as weighing, labeling, additional packaging, freezing, drying, cooking, etc.

A suitable control system 1096, which can include a microprocessor 1098, can be provided and located in a control system and enclosure 1100 with a touch screen display 1102 mounted on a door 1104 of the enclosure 1100. The control system can include various sensors, which can be connected to its inputs, for monitoring and interactively controlling the operation of the system 1002. Operation of the various system components can be controlled by outputs from the control system 1096, such as speed and load control for the drive motor 1036, temperature control for the sealing bar 1082, and coolant circulation pump control. The bag sealing system 1002 is suited for operation in an automated plant, whereby the product supply, loading, discharge and packaging procedures can be automated. The control system 1096 is also connected to an electrical power source 1095 powering the seal bars 1082, a vacuum source 1097 for controlling the selective application of vacuum to the vacuum chambers 1070, the pressurized air source 1078 for controlling the selective application of pressurized air through the air inlet ports 1076 and a coolant source 1099 for controlling the selective application of coolant through the coolant inlet ports 1090. Vacuum, pressurized air and coolant are distributed from their respective sources 1097, 1078 and 1099 through a rotary manifold distribution mechanism 1093 to the domes 1012.

Figure 29:
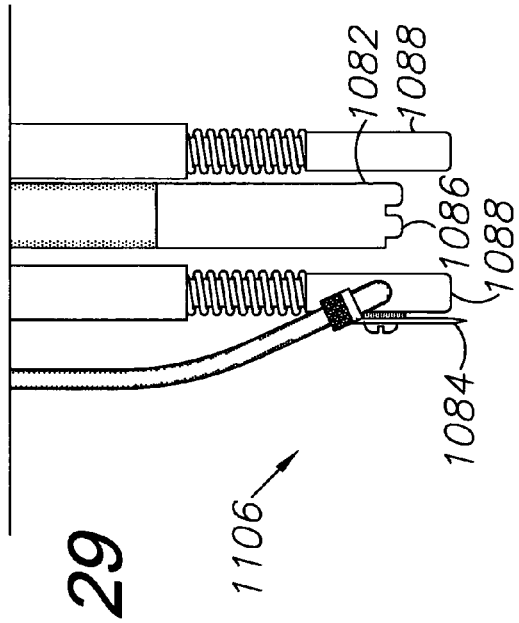
FIG. 29 is an enlarged, fragmentary view of a modified sealing assembly of another alternative embodiment of the present invention, with the cutoff blade thereof mounted on the outside face of a cooling bar.

A modified sealing assembly 1106 of another alternative embodiment of the present invention is shown in FIG. 29 and includes the cut-off blade 1084 mounted on the outside of the cooling bar 1088. In this configuration any cutoff portion 1049 of the neck 1048 would occur further away from the seam 1087, whereby less or possibly no waste or scrap material is produced from each bag 1028. It will be appreciated that the cut-off blade 1084 can be eliminated altogether, or deactivated by raising it to an inoperative position on the sealing assembly, whereby no waste or scrap bag material is produced in the sealing operation and the original neck is simply left in its original, full-length configuration.

It is to be understood that while certain embodiments of the invention have been shown and described, the invention is not to be limited thereto and can assume a wide variety of alternative configurations, including different materials, sizes, components and methods of operation. Moreover, the system and method of the present invention can be adapted to various applications, including the manufacture of bags and other products from thermoplastic film, forming multiple seals on bags and sealing the sides and ends of bags.

What is claimed and desired to be secured by Letters Patent is as follows:

1. A system for sealing thermoplastic bags, which system comprises:

a platen conveyor with a platen conveyor travel path;

a platen mounted on said platen conveyor and including a support adapted to receive thermoplastic film thereon;

a dome conveyor with a dome conveyor travel path;

a dome mounted on the dome conveyor and including a vacuum chamber;

said platen and dome conveyor paths having contiguous portions whereat said dome is positioned over said platen and noncontiguous portions whereat said dome is not positioned over said platen;

said dome having a raised position spaced above said platen and a lowered position on said platen whereby said vacuum chamber is enclosed along the contiguous portions of said travel paths;

one of said dome and said platen having a sealing assembly sealing said bag with said dome in its lowered position, said sealing assembly including a liquid coolant source connected to said sealing assembly and cooling same;

vacuum, sealing and ventilation stations in said conveyor travel path contiguous portions;

a vacuum source connected to said vacuum chamber and activated at said vacuum station;

said vacuum source being deactivated at said ventilation station;

said platen conveyor travel path including a load area whereat products within bags are loaded on said platen upstream of said the contiguous conveyor travel paths;

said dome conveyor travel path including a discharge area whereat said products and sealed bags are discharged from said platen;

a drive mechanism including a drive motor and a drive shaft drivingly connected to said drive motor and to said conveyors;

a sealing support assembly adapted to receive thermoplastic film thereon;

a sealing bar assembly including a heated sealing bar;

a heat source associated with said sealing bar and adapted for continuously heating same;

said sealing bar assembly including first and second heat sink plates connected to the coolant source and positioned on opposite sides of said sealing bar in a thermal exchange relationship therewith;

said sealing bar including a lower edge sealing surface and being movable between a raised position retracted relative to said heat sink plates and a lowered position relative to said heat sink plates with said sealing bar lower edge sealing surface engaging said thermoplastic film;

each said heat sink plate including a respective lower edge of non-sealing contact surface; and said sealing bar assembly including a raised position with said heat sink plate lower edges of non-sealing contact surfaces spaced above said thermoplastic film and a lowered position with said heat sink plate lower edges of non-sealing contact surfaces engaging said thermoplastic film and clamping same against said sealing support assembly.

2. The system according to claim 1, which includes:

said sealing bar assembly including an air bladder connected to said sealing bar and said heat sink plates, said air bladder having a deflated configuration with said sealing bar assembly in its raised position and an inflated configuration with said sealing bar assembly in its lowered position; and a compressed air source connected to said bladder and adapted for inflating same.

3. The system according to claim 2 wherein:

said sealing bar assembly includes a spring suspension connecting said heat sink plates to said sealing bar, said spring suspension biasing said sealing bar towards its retracted position with said sealing bar assembly raised and compressing with said sealing bar and heat sink plate lower edges engaging said thermoplastic film in said lowered position.

4. The system according to claim 1, which includes:

each said heat sink plate having a coolant passage extending therethrough; and said coolant source being connected to said coolant passages and adapted to circulate coolant therethrough.

5. The system according to claim 1 wherein said heat source comprises an electrical resistance heater imbedded in said sealing bar and adapted for connection to an electrical power source.

6. The system according to claim 1, which includes:

said sealing support assembly including a cutoff blade and an engagement gasket adapted for clamping said thermoplastic film against said sealing bar assembly with said sealing bar assembly in its lowered position, said sealing bar assembly pushing said thermoplastic film over said cutoff blade in said lowered position.

7. The system according to claim 1 wherein said sealing support assembly includes:

an engagement gasket adapted for clamping said thermoplastic film against said sealing bar assembly with said sealing bar assembly in its lowered position;

a cutoff blade having a lowered position retracted in said sealing support assembly and an extended position projecting therefrom;

an air bladder having a deflated configuration with said cutoff blade in its lowered position and an inflated configuration with said cutoff blade in its extended position; and a three-way valve including an actuator actuated by said scaling bar assembly between a first position admitting air into said bladder and a second position discharging air from said bladder.

8. The system according to claim 1, which includes:

said thermoplastic film forming a bag with an open neck;

a neck retention structure mounted in proximity to said sealing support assembly and including a pair of neck retention pins each adapted for placement in said open neck for holding same open until sealed by said sealing bar; and said neck retention structure including a pair of springs each biasing a respective neck retention pin outwardly in said open neck.

9. The system according to claim 1, which includes:

said sealing support assembly being mounted on said platen upper surface;

a cradle mounted on said platen upper surface adjacent to said sealing support assembly, said cradle being adapted to receive a thermoplastic film bag with an item to the bagged located therein and with an open neck of said bag being placed on said sealing support assembly prior to sealing same;

said sealing bar assembly being matted on said vacuum chamber cover generally within said vacuum chamber;

said vacuum chamber cover including a discharge air valve adapted for selectively discharging air from said vacuum chamber;

an inlet air valve adapted for selectively admitting air to said vacuum chamber;

said sealing bar being continuously heated during operation;

a microprocessor controller connected to said device and adapted for controlling timing, temperature and pressure operating parameters of said device; and a sensor connected to said microprocessor and adapted for sensing an operating condition of said device whereby said microprocessor responds to input from said sensor and modifies the operation of the device accordingly.

* * * * *